United States Patent
Shi et al.

(10) Patent No.: US 11,725,534 B2
(45) Date of Patent: Aug. 15, 2023

(54) METHOD OF MULTI-OBJECTIVE AND MULTI-DIMENSIONAL ONLINE JOINT MONITORING FOR NUCLEAR TURBINE

(71) Applicant: Shanghai Power Equipment Research Institute Co., Ltd, Shanghai (CN)

(72) Inventors: Jinyuan Shi, Shanghai (CN); Xuefei Fan, Shanghai (CN); Yuesheng Xie, Shanghai (CN); Jun Jiang, Shanghai (CN); Luyi Jiang, Shanghai (CN); Zhijie Zhu, Shanghai (CN); Chengyi Zhang, Shanghai (CN); Lin Zhang, Shanghai (CN); Xinxuan Kong, Shanghai (CN); Wangren Xu, Shanghai (CN); Zifang Zhu, Shanghai (CN); Yuxuan Wang, Shanghai (CN)

(73) Assignee: Shanghai Power Equipment Research Institute Co., Ltd, Shanghai (CN)

( * ) Notice: Subject to any disclaimer, the term of this patent is extended or adjusted under 35 U.S.C. 154(b) by 196 days.

(21) Appl. No.: 17/691,040

(22) Filed: Mar. 9, 2022

(65) Prior Publication Data
US 2023/0167751 A1 Jun. 1, 2023

(30) Foreign Application Priority Data

Dec. 1, 2021 (CN) .......................... 202111452774.4
Dec. 1, 2021 (CN) .......................... 202111452788.6
(Continued)

(51) Int. Cl.
*F01D 21/00* (2006.01)
*G01M 13/045* (2019.01)
(Continued)

(52) U.S. Cl.
CPC ........... *F01D 21/003* (2013.01); *F01D 19/02* (2013.01); *F01D 21/12* (2013.01); *F01D 21/14* (2013.01);
(Continued)

(58) Field of Classification Search
CPC ........ F01D 21/003; F01D 19/02; F01D 21/12; F01D 21/14; F01K 3/181; F01K 13/02;
(Continued)

(56) References Cited

U.S. PATENT DOCUMENTS 3,158,002 A * 11/1964 Spillmann ................. F02C 9/24
976/DIG. 219
3,503,204 A * 3/1970 Peter ......................... G21D 3/14
376/241
(Continued)

FOREIGN PATENT DOCUMENTS

CN 102059503 A 5/2011
CN 102505969 A 6/2012
(Continued)

OTHER PUBLICATIONS

Office Action dated Sep. 13, 2022 in Chinese Patent Application No. 20211456672.X, 71 pages including English Translation.
(Continued)

*Primary Examiner* — Hoang M Nguyen
(74) *Attorney, Agent, or Firm* — BakerHostetler

(57) ABSTRACT

The present disclosure provides a method of multi-objective and multi-dimensional online joint monitoring for a nuclear turbine. The method includes: obtaining first temperature monitoring data of the nuclear turbine by performing online thermal monitoring on a rotor, a valve cage and a cylinder of the nuclear turbine under quick starting-up; obtaining second temperature monitoring data of tightness of a flange association plane of the cylinder of the nuclear turbine by
(Continued)

performing online thermal monitoring on the tightness of the flange association plane; obtaining operation monitoring data of a shafting vibration of a rotor and bearing system of the nuclear turbine by performing online safety monitoring on the shafting vibration of the rotor and bearing system; and optimizing operation and maintenance control of the nuclear turbine according to at least one type of monitoring data among the first temperature monitoring data, the second temperature monitoring data and the operation monitoring data.

20 Claims, 10 Drawing Sheets

(30) Foreign Application Priority Data

| Dec. 1, 2021 | (CN) | ............................ 202111455162.0 |
| Dec. 1, 2021 | (CN) | ............................ 202111456672.X |
| Dec. 1, 2021 | (CN) | ............................ 202111456674.9 |
| Dec. 1, 2021 | (CN) | ............................ 202111456675.3 |

(51) Int. Cl.

| G01N 25/00 | (2006.01) |
| G21D 3/08 | (2006.01) |
| G01M 13/028 | (2019.01) |
| F01K 3/18 | (2006.01) |
| F01D 21/12 | (2006.01) |
| F01D 19/02 | (2006.01) |
| F01D 21/14 | (2006.01) |
| F01K 13/02 | (2006.01) |

(52) U.S. Cl.
CPC .............. *F01K 3/181* (2013.01); *F01K 13/02* (2013.01); *G01M 13/028* (2013.01); *G01M 13/045* (2013.01); *G01N 25/00* (2013.01); *G21D 3/08* (2013.01); *F05D 2220/30* (2013.01)

(58) Field of Classification Search
CPC .. G01M 13/028; G01M 13/045; G01N 25/00; G21D 3/08; F05D 2220/30

USPC ................... 60/644.1, 646, 657; 415/47, 118
See application file for complete search history.

(56) References Cited

U.S. PATENT DOCUMENTS

| 4,505,873 | A | * | 3/1985 | Petetrot | .................... G21D 3/12 |
| | | | | | 60/644.1 |
| 7,614,233 | B2 | * | 11/2009 | Chaki | .................... G21C 1/084 |
| | | | | | 60/644.1 |
| 2004/0148129 | A1 | | 7/2004 | Gotoh et al. | |
| 2015/0081121 | A1 | | 3/2015 | Morgan et al. | |
| 2015/0128596 | A1 | | 5/2015 | Thompson et al. | |
| 2015/0184549 | A1 | | 7/2015 | Pamujula et al. | |
| 2018/0283221 | A1 | | 10/2018 | Reigl et al. | |
| 2021/0254492 | A1 | | 8/2021 | Kumar | |

FOREIGN PATENT DOCUMENTS

| CN | 105781632 A | 7/2016 |
| CN | 112668111 A | 4/2021 |
| CN | 113404560 A | 9/2021 |
| JP | H05149782 A | 6/1993 |

OTHER PUBLICATIONS

Jinyuan Shi, "Maintenance Interval Optimization Based on Design Life of Steam Turbines," Journal of Chinese Society of Power Engineering, vol. 40, No. 7, Jul. 2020, pp. 530-539, English Abstract.

Office Action dated Sep. 23, 2022 in Chinese Patent Application No. 20211456675.3, 33 pages including English Translation.

Office Action dated Oct. 9, 2022 in Chinese Patent Application No. 20211456674.9, 80 pages including English Translation.

Office Action dated Oct. 12, 2022 in Chinese Patent Application No. 20211452788.6, 20 pages including English Translation.

Office Action dated Dec. 1, 2022 in Australian Patent Application No. 2022201697, 8 pages.

* cited by examiner

METHOD OF MULTI-OBJECTIVE AND MULTI-DIMENSIONAL ONLINE JOINT MONITORING FOR NUCLEAR TURBINE

CROSS REFERENCE TO RELATED APPLICATION

This application is based on and claims priorities to Chinese patent application Nos. 202111452788.6, 202111452774.4, 202111456674.9, 202111456672.X, 202111456675.3, and 202111455162.0, all filed on Dec. 1, 2021, the entire contents of which are incorporated by reference herein.

TECHNICAL FIELD

The present disclosure relates to a field of nuclear turbine technologies, and more particularly to a method and a system of multi-objective and multi-dimensional online joint monitoring for a nuclear turbine.

BACKGROUND

Production of electricity from nuclear energy does not discharge carbon dioxide and is important for the production of electricity in a manner that achieves "carbon neutrality". In order to improve service life, safety and reliability of a nuclear turbine and ensure long-term safe operation of the nuclear turbine, it is required to perform online monitoring on key components of the nuclear turbine.

SUMMARY

Embodiments of a first aspect of the present disclosure provide a method of multi-objective and multi-dimensional online joint monitoring for a nuclear turbine. The method includes:

obtaining first temperature monitoring data of the nuclear turbine by performing online thermal monitoring on a rotor, a valve cage and a cylinder of the nuclear turbine under quick starting-up;

obtaining second temperature monitoring data of tightness of a flange association plane of the cylinder of the nuclear turbine by performing online thermal monitoring on the tightness of the flange association plane;

obtaining operation monitoring data of a shafting vibration of a rotor and bearing system of the nuclear turbine by performing online safety monitoring on the shafting vibration of the rotor and bearing system; and optimizing operation and maintenance control of the nuclear turbine according to at least one type of monitoring data among the first temperature monitoring data, the second temperature monitoring data and the operation monitoring data.

Embodiments of a second aspect of the present disclosure provide an electronic device. The electronic device includes:

at least one processor; and a memory communicatively connected to the at least one processor; in which, the memory stores instructions executable by the at least one processor, and when the instructions are executed by the at least one processor, the at least one processor is configured to:

obtaining first temperature monitoring data of the nuclear turbine by performing online thermal monitoring on a rotor, a valve cage and a cylinder of the nuclear turbine under quick starting-up;

obtaining second temperature monitoring data of tightness of a flange association plane of the cylinder of the nuclear turbine by performing online thermal monitoring on the tightness of the flange association plane;

obtaining operation monitoring data of a shafting vibration of a rotor and bearing system of the nuclear turbine by performing online safety monitoring on the shafting vibration of the rotor and bearing system; and optimize operation and maintenance control of the nuclear turbine according to at least one type of monitoring data among the first temperature monitoring data, the second temperature monitoring data and the operation monitoring data.

Embodiments of a third aspect of the present disclosure provide a non-transiency computer-readable storage medium having computer instructions stored thereon. The computer instructions are configured to cause a computer to execute the method of multi-objective and multi-dimensional online joint monitoring for the nuclear turbine. The method includes:

obtaining first temperature monitoring data of the nuclear turbine by performing online thermal monitoring on a rotor, a valve cage and a cylinder of the nuclear turbine under quick starting-up;

obtaining second temperature monitoring data of tightness of a flange association plane of the cylinder of the nuclear turbine by performing online thermal monitoring on the tightness of the flange association plane;

obtaining operation monitoring data of a shafting vibration of a rotor and bearing system of the nuclear turbine by performing online safety monitoring on the shafting vibration of the rotor and bearing system; and optimizing operation and maintenance control of the nuclear turbine according to at least one type of monitoring data among the first temperature monitoring data, the second temperature monitoring data and the operation monitoring data.

DETAILED DESCRIPTION

Figure 1:
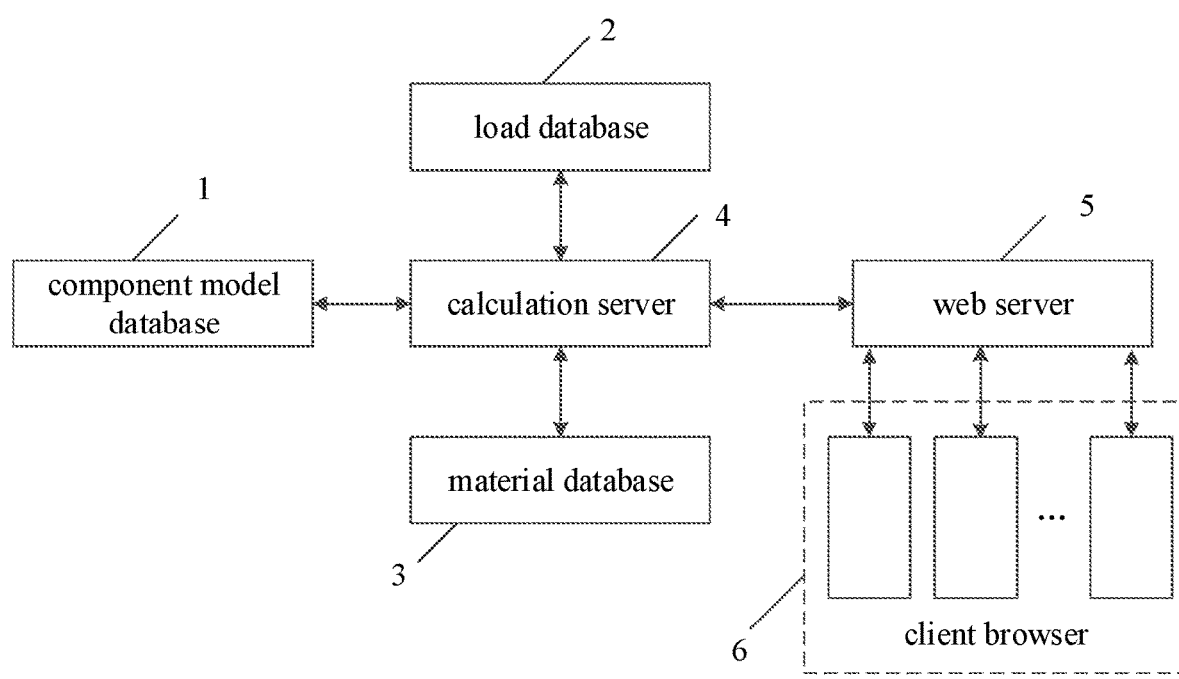
FIG. 1 is a schematic diagram illustrating a joint monitoring platform for a nuclear turbine according to an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are illustrative, used to explain the present disclosure, not construed to limit the present disclosure.

FIG. 1 is a schematic diagram illustrating a joint monitoring platform for a nuclear turbine according to an embodiment of the present disclosure. As illustrated in FIG. 1, the joint monitoring platform includes a component model database 1, a load database 2, a material database 3, a calculation server 4, a web server 5 and a client browser 6.

The component model database 1 stores component design parameters and three-dimensional mechanical models of the nuclear turbine. The load database 2 stores a pressure load, a centrifugal load, a thermal load, a pretension load in bolt, a stiffness coefficient and a damping coefficient of a bearing oil film, a metal temperature of a measuring point at depth of 85%-95% of a wall thickness of an inner cylinder, a metal temperature of a measuring point at depth of 85%-95% of the wall thickness of the valve cage and the cylinder, a metal temperature of a measuring point at depth of 45%-50% of the wall thickness of the valve cage and the cylinder, an outer metal temperature on outer side of a flange association plane in case that steam leakage occurs at a position with the weakest tightness on the flange association plane of the cylinder, a peak-to-peak value $D_{p\text{-}pr}(\mu m)$ of an online monitoring shafting vibration relative displacement of a rotor journal of the nuclear turbine, an online monitoring vibration speed $V_b(mm/s)$ of a bearing block of the nuclear turbine, a start-stop curve of the nuclear turbine. The material database 3 stores material physical properties, material mechanical properties, high-temperature long-term mechanical properties and fatigue fracture mechanical properties of the nuclear turbine. The calculation server 4 includes a memory, a processor and a computer program of multi-objective and multi-dimensional online safety monitoring for the nuclear turbine stored in the memory and executable on the processor. When the processor executes the computer program, a method of multi-objective and multi-dimensional online joint monitoring for the nuclear turbine provided by the present disclosure is realized.

The component model database 1, the load database 2 and the material database 3 are communicatively connected with the computer server 4, configured to send mechanical models and data that are required by the rotor of the nuclear turbine when operating under different objects and different dimensions for monitoring to the computer server 4.

The computer server 4 communicates with the web server 5, and the web server 5 communicates with the client browser 6. Monitoring data or optimization information may be fed back to the web server 5 and the client browser 6 for display.

A method of multi-objective and multi-dimensional online joint monitoring for a nuclear turbine, a system, an electronic device and a storage medium provided according to embodiments of the present disclosure is described with reference to the drawings.

Figure 2:
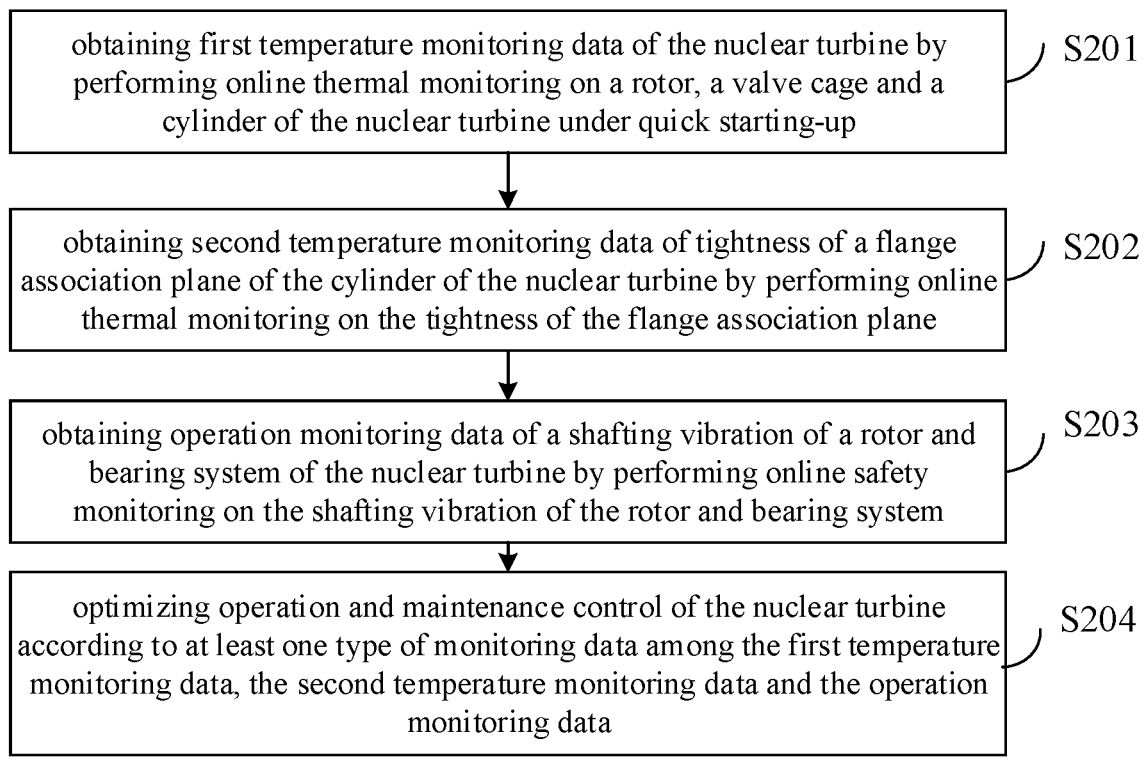
FIG. 2 is a flow chart illustrating a method of multi-objective and multi-dimensional online joint monitoring for a nuclear turbine according to an embodiment of the present disclosure.

FIG. 2 is a flow chart illustrating a method of multi-objective and multi-dimensional online joint monitoring for a nuclear turbine according to an embodiment of the present disclosure. Multiple objectives may include long life, high safety and high reliability, etc., and multiple dimensions may include a rotor, a valve cage and a cylinder under quick starting-up, tightness of a flange association plane of the cylinder and safety of a shafting vibration of a rotor and bearing system, etc.

As illustrated in FIG. 2, the method includes the following blocks.

At block S201, first temperature monitoring data of the nuclear turbine is obtained by performing online thermal monitoring on a rotor, a valve cage and a cylinder of the nuclear turbine under quick starting-up.

Under a condition of quick starting-up, certain damage will be caused on some components of the nuclear turbine. The damage of the nuclear turbine under an action of thermal stress caused by the quick starting-up is mainly reflected in components such as the rotor, the valve cage and the cylinder of the nuclear turbine.

The quick starting-up may cause an action of thermal stress. In the present disclosure, the online thermal monitoring may be performed on the rotor, the valve cage and the cylinder of the nuclear turbine under quick starting-up to obtain online thermal monitoring data of the rotor, the valve cage and the cylinder. In order to improve accuracy of monitoring, temperature monitoring data for optimizing operation of the nuclear turbine may be determined based on the online thermal monitoring data of the rotor, the valve cage and the cylinder.

At block S202, second temperature monitoring data of the tightness of the flange association plane is obtained by performing online thermal monitoring on the tightness of the flange association plane.

The tightness of the flange association plane may determine steam leakage of the flange association plane of the cylinder. In order to avoid hazards and pollution caused by the steam leakage, in the present disclosure, it is required to monitor the tightness of the flange association plane of the cylinder of the nuclear turbine and obtain the second temperature monitoring data of the tightness of the flange association plane. The second temperature monitoring data may be configured to determine whether the steam leakage occurs at the flange association plane of the cylinder of the nuclear turbine, so as to optimize the operation and maintenance control of the nuclear turbine in time or in advance and improve safety.

At block S203, operation monitoring data of the shafting vibration is obtained by performing online safety monitoring on the shafting vibration of the rotor and bearing system.

When the rotor and bearing system are subjected to forced vibration and self-excited vibration, certain damage will be caused on some components of the nuclear turbine, thus affecting safety and service life of the nuclear turbine. In the embodiment of the present disclosure, the online safety monitoring is performed on the shafting vibration of the rotor and bearing system of the nuclear turbine to determine the operation monitoring data of the shafting vibration. With determining whether the rotor and bearing system has problems through the operation monitoring data, affecting normal operations of the nuclear turbine may be avoided.

At block S204, operation and maintenance control of the nuclear turbine is optimized according to at least one type of monitoring data among the first temperature monitoring data, the second temperature monitoring data and the operation monitoring data.

It may be determined whether the nuclear turbine meets monitoring qualification conditions according to the first temperature monitoring data, the second temperature monitoring data and the operation monitoring data. In a case that one type of monitoring data does not meet its monitoring qualification condition, the nuclear turbine is optimized based on abnormal monitoring data that does not meet the monitoring qualification condition.

The abnormal monitoring data may include one or more. The nuclear turbine respectively may be optimized according to various abnormal monitoring data. Or various abnormal monitoring data may be analyzed jointly to form an analysis result, and the nuclear turbine may be optimized comprehensively based on the analysis result.

In embodiments of the present disclosure, multi-objective and multi-dimensional online monitoring is performed on the nuclear turbine to obtain multi-dimensional monitoring data. The service life, safety and reliability of the nuclear turbine may be optimized based on the multi-dimensional monitoring data, to ensure long-life, high safety and high reliability operation of the nuclear turbine under an action of various damage mechanisms.

Figure 3:
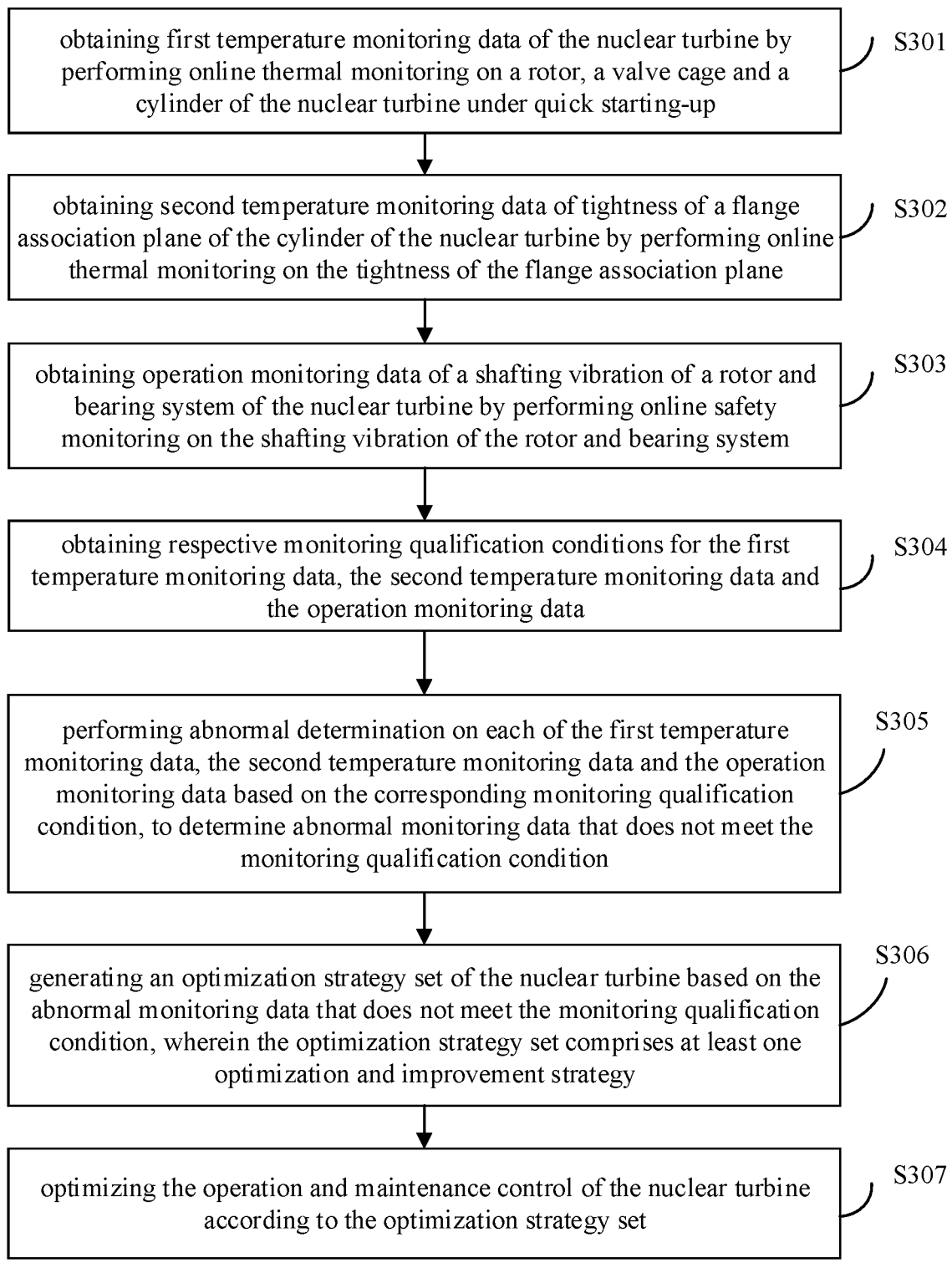
FIG. 3 is a flow chart illustrating a method of multi-objective and multi-dimensional online joint monitoring for a nuclear turbine according to another embodiment of the present disclosure.

FIG. 3 is a flow chart illustrating a method of multi-objective and multi-dimensional online joint monitoring for a nuclear turbine according to another embodiment of the present disclosure. As illustrated in FIG. 3, the method includes the following blocks.

At block S301, first temperature monitoring data of the nuclear turbine is obtained by performing online thermal monitoring on a rotor, a valve cage and a cylinder of the nuclear turbine under quick starting-up.

Alternatively, thermal stress monitoring parameters of the rotor, the valve cage and the cylinder of the nuclear turbine under quick starting-up for multiple operation conditions are obtained. Further, a temperature difference ratio of the rotor, a temperature difference ratio of the valve cage and a temperature difference ratio of the cylinder are obtained according to the thermal stress monitoring parameters. And a temperature difference ratio of the nuclear turbine is determined as the first temperature monitoring data according to the temperature difference ratio of the rotor, the temperature difference ratio of the valve cage and the temperature difference ratio of the cylinder.

In some embodiments, an average temperature difference in volume and the thermal stress monitoring parameters of the target component are obtained. The target component is one of the rotor, the valve cage and the cylinder. Material attribute data of a material corresponding to the target component at an operating temperature is obtained. The temperature difference ratio of the target component is determined according to the average temperature difference in volume, the material attribute data and the thermal stress monitoring parameters of the target component.

Alternatively, a maximum temperature difference ratio is selected from the temperature difference ratio of the rotor, the temperature difference ratio of the valve cage and the temperature difference ratio of the cylinder. The maximum temperature difference ratio is determined as the temperature difference ratio of the nuclear turbine. The maximum temperature difference ratio is the first temperature monitoring data of the nuclear turbine.

At block S302, second temperature monitoring data of the tightness of the flange association plane is obtained by performing online thermal monitoring on the tightness of the flange association plane.

Alternatively, performing the online thermal monitoring on the tightness of the flange association plane of the cylinder of the nuclear turbine includes: obtaining a monitoring temperature limit value for the tightness of the flange association plane of the cylinder of the nuclear turbine; obtaining an outer metal temperature of the tightness of the flange association plane of the cylinder; and determining the second temperature monitoring data of the flange association plane according to the monitoring temperature limit value and the outer metal temperature after obtaining the monitoring temperature limit value and the outer metal temperature.

Alternatively, an outer metal temperature ratio for the flange association plane is determined as the second temperature monitoring data according to the outer metal temperature and the monitoring temperature limit value.

At block S303, operation monitoring data of the shafting vibration is obtained by performing online safety monitoring on the shafting vibration of the rotor and bearing system.

Alternatively, a peak-to-peak value of an online monitoring shafting vibration relative displacement of a rotor journal and an online monitoring vibration speed of a bearing block in a case that the rotor and bearing system of the nuclear turbine is under an action of forced vibration and self-excited vibration are obtained both as online monitoring data of the shafting vibration. The operation monitoring data of the shafting vibration is determined according to the online monitoring data of the shafting vibration.

In some embodiments, after the peak-to-peak value of the online monitoring shafting vibration relative displacement of the rotor journal, a shafting vibration relative displacement ratio may be determined according to the peak-to-peak value of the online monitoring shafting vibration relative displacement of the rotor journal. After the online monitoring vibration speed of the bearing block is obtained, an online monitoring vibration speed ratio is determined according to the online monitoring vibration speed of the bearing block. The shafting vibration relative displacement ratio and the online monitoring vibration speed ratio are determined as the operation monitoring data of the shafting vibration.

At block S304, respective monitoring qualification conditions for the first temperature monitoring data, the second temperature monitoring data and the operation monitoring data are obtained.

The first temperature monitoring data may correspond to a monitoring qualification condition that the rotor, the valve cage and the cylinder operate safely under quick starting-up. The second temperature monitoring data may correspond to a monitoring qualification condition that the tightness of the flange association plane ensures no steam leakage of the nuclear turbine. The operation monitoring data may correspond to a monitoring qualification condition that the rotor and bearing system operates safely under the action of the forced vibration and the self-excited vibration.

In this disclosure, after monitoring data of each dimension is determined, the respective monitoring qualification conditions may be determined from a monitoring qualification condition set based on a monitoring object and a monitoring dimension to which the monitoring data belong.

At block S305, abnormal determination is performed on each of the first temperature monitoring data, the second temperature monitoring data and the operation monitoring data respectively based on the corresponding monitoring qualification condition, to determine abnormal monitoring data that does not meet the monitoring qualification condition.

Compare each monitoring data with its own monitoring qualification condition to determine whether each monitoring data meets its own monitoring qualification condition. For the first temperature monitoring data, the second temperature monitoring data and the operation monitoring data, the monitoring data that does not meet its own monitoring qualification condition is determined as abnormal monitoring data. The abnormal monitoring data may reflect risks of relevant components of the nuclear turbine, and then the operation and maintenance control may be optimized based on the abnormal monitoring data.

At block S306, an optimization strategy set of the nuclear turbine is generated based on the abnormal monitoring data that does not meet the monitoring qualification condition. The optimization strategy set includes at least one optimization and improvement strategy.

There may include one or more abnormal monitoring data, and the optimization and improvement strategies of the nuclear turbine may be generated respectively according to various abnormal monitoring data. An optimization strategy set may be formed based on the generated optimization and improvement strategies. It is noted that the optimization strategy set may include one optimization and improvement strategy.

At block S307, the operation and maintenance control of the nuclear turbine is optimized according to the optimization strategy set.

Alternatively, the optimization strategy set is traversed. Whenever traversing to one of the optimization and improvement strategies, the optimization and improvement strategy is analyzed to extract an optimization object on the nuclear turbine and optimization information of the optimization object.

Alternatively, the optimization and improvement strategy includes identification information of an optimization object to be optimized, such as a name or a serial number of the optimization object. In some implementations, the identification information may be the name of the optimization object, and the name of the object may be extracted from the optimization and improvement strategy through semantic analysis, which is as the identification information. In other implementations, when the serial number is used as the identification information, characteristic symbols may be set before and after the serial number. For example, #3# may be used as a field, which may indicate that the number of "3" is the identification information.

For each optimization and improvement strategy, the optimization and improvement strategy may include optimization information of each of at least one optimization object, and the optimization information is configured to indicate how to adjust or optimize the optimization object corresponding to the optimization information.

After identifying the identification information from the optimization and improvement strategy, optimization information matched with the identification information may be determined from multiple optimization information based on the identification information, and the optimization information matched with the identification information is determined as the optimization information of an optimization object identified by the identification information. After obtaining the optimization information of respective optimization objects, optimization adjustment may be performed based on the optimization information of respective optimization objects.

For example, when the first temperature monitoring data is the abnormal monitoring data, the quick starting-up process of the nuclear turbine may be optimized. That is, the optimization object may be the quick starting-up process, and the optimization information may be information of the quick starting-up process, such as, a starting-up procedure or starting-up logic, or a starting-up condition, or a starting-up monitoring parameter, etc.

For another example, when the second temperature monitoring data is the abnormal monitoring data, the nuclear turbine may be shut down for maintenance and continue to operate after increasing a pretension force in bolt. That is, the optimization object may be the bolt, and the optimization information may be increasing the pretension force in bolt, or a subsequent operation procedure, etc.

For another example, when the operation monitoring data is the abnormal monitoring data, the rotor and the bearing of the nuclear turbine may be examined and repaired to find out a reason of excessive vibration of the rotor and the bearing and to make improvement. That is, the optimization object may be the rotor and bearing system, the optimization information may be a scheme for examining and repairing, a purpose for examining and repairing or a condition for ending examining and repairing of the rotor and bearing system.

In embodiments of the present disclosure, multi-objective and multi-dimensional online monitoring is performed on the nuclear turbine to obtain multi-dimensional monitoring data. The service life, safety and reliability of the nuclear turbine may be optimized based on the multi-dimensional monitoring data, to ensure long-life, high safety and high reliability operation of the nuclear turbine under an action of various damage mechanisms.

As a possible implementation, after optimizing the optimization object, supervising the abnormal monitoring data that does not meet the monitoring qualification condition is continued. In response to monitoring data obtained again still not meeting the monitoring qualification condition, the optimization and improvement strategy is updated, and optimizing the optimization object is continued based on the updated optimization and improvement strategy to enable all kinds of monitoring data meet respective monitoring qualification conditions.

Alternatively, the optimization and improvement strategy may also be fed back to operation and maintenance personnel for confirmation. When it is required adjust the optimization and improvement strategy, an adjustment instruction may be received, and the optimization and improvement strategy may be fine-tuned according to the adjustment instruction, so as to better optimize the control of the nuclear turbine, which is conducive to ensuring the long-life, the high safety and the high reliability operation of the nuclear turbine.

It is noted that, in this disclosure, the online monitoring may be performed simultaneously on three aspects: the rotor, the valve cage and the cylinder under the quick starting-up, the tightness of the flange association plane of the cylinder and the shafting vibration of the rotor and bearing system. Or, the online monitoring may be performed on two combinations in the three aspects, for example, the online monitoring may be performed simultaneously on the rotor, the valve cage and the cylinder under the quick starting-up and the tightness of the flange association plane of the cylinder; for another example, the online monitoring may be performed simultaneously on the rotor, the valve cage and the cylinder under the quick starting-up and the shafting vibration of the rotor and bearing system, for another example, the online monitoring may be performed simultaneously on the tightness of the flange association plane of the cylinder and the shafting vibration of the rotor and bearing system.

For convenience of description, flows for the online monitoring in the above three aspects will be described separately below. Those skilled in the art should know that the flows for the online monitoring in the three aspects are allowed to be combined in this application to form joint monitoring.

Figure 4:
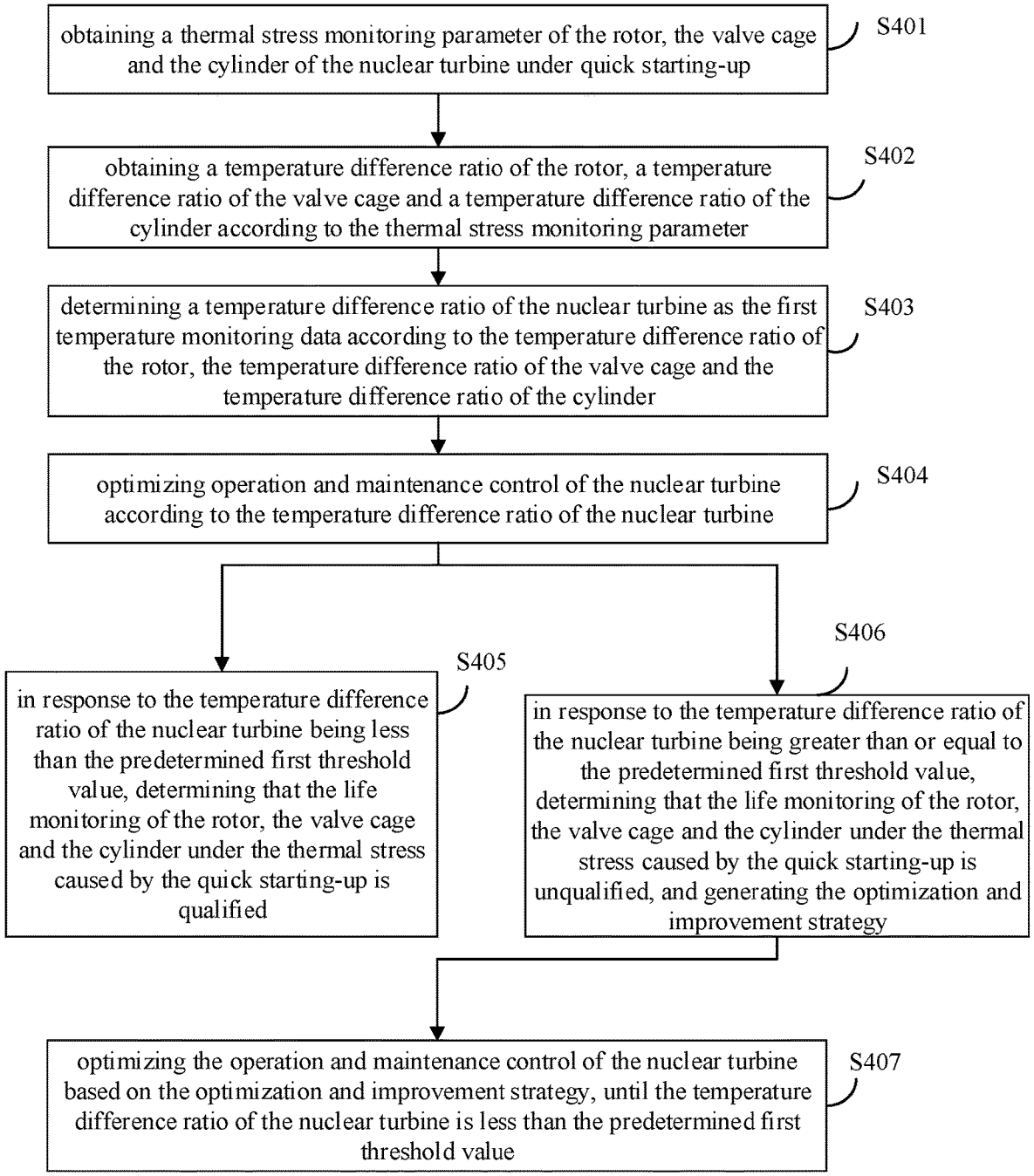
FIG. 4 is a flow chart illustrating a method of online monitoring on a rotor, a valve cage and a cylinder of a nuclear turbine under quick starting-up according to another embodiment of the present disclosure.

FIG. 4 is a flow chart illustrating a method of online monitoring on a rotor, a valve cage and a cylinder of a nuclear turbine under quick starting-up according to another embodiment of the present disclosure. As illustrated in FIG. 4, the method includes the following blocks.

At block S401, thermal stress monitoring parameters of a rotor, a valve cage and a cylinder of a nuclear turbine under quick starting-up are obtained.

Under an action of thermal stress caused by the quick starting-up, certain damage will be caused on some components of the nuclear turbine. The damage of the nuclear turbine under the action of thermal stress caused by quick starting-up is mainly reflected in components such as the rotor, the valve cage and the cylinder of the nuclear turbine.

In embodiments of the present disclosure, a metal temperature of a measuring point within a first predetermined depth range of a wall thickness of an inner cylinder, metal temperatures of respective measuring points within a second predetermined depth range and a third predetermined depth range of a wall thickness of the valve cage, and data of design parameters, three-dimensional mechanical models and material mechanical properties of the rotor, the valve cage and the cylinder of the nuclear turbine are obtained respectively. The rotor, the valve cage and the cylinder are simulated under excessive thermal stress during quick starting-up, so as to obtain a thermal stress corresponding to N-year life for the rotor of the nuclear turbine, a thermal stress corresponding to the N-year life for the valve cage of the nuclear turbine, a thermal stress corresponding to the N-year life for the cylinder of the nuclear turbine, and a volume average temperature of the rotor during a process of starting-up, shutting down or operating of the nuclear turbine. It is noted that the volume average temperature of the rotor is a simulation value of the volume average temperature simulated in a simulation process.

Alternatively, N is an in-service lifetime of the nuclear turbine, for example, N may take a value of 60.

At block S402, a temperature difference ratio of the rotor, a temperature difference ratio of the valve cage and a temperature difference ratio of the cylinder are obtained according to the thermal stress monitoring parameters.

An average temperature difference in volume, a thermal stress monitoring parameter of the target component and material attribute data of a material corresponding to the target component at an operating temperature are obtained. The temperature difference ratio of the target component are determined according to the average temperature difference in volume, the material attribute data and the thermal stress monitoring parameter of the target component.

In some implementations, descriptions will be made by taking that the target component is the rotor as an example. An average temperature difference in volume $\Delta t_{mr}$ of the rotor is obtained according to the simulation value $t_{mi}$ of the average temperature in volume of the rotor and the metal temperature $t_{95r}$ at the measuring point within the first predetermined depth range of the wall thickness of the inner cylinder of the nuclear turbine, which is $\Delta_{mr}=|t_{mi}-t_{95r}|$. For example, the first predetermined depth range may be a depth range of 85%-95% of the wall thickness of the inner cylinder. The temperature difference ratio $R_{\Delta tr}$ of the rotor may be obtained according to the average temperature difference in volume $\Delta t_{mr}$ of the rotor and the thermal stress monitoring parameter $\sigma_{thr}$ of the rotor, and an elastic modulus $E_1$, a coefficient of linear expansion $\beta_1$ and a Poisson's ratio $\mu_1$ of a material corresponding to the rotor at the operating temperature, by using the following formula:

$$R_{\Delta tr} = \frac{\Delta t_{mr} E_1 \beta_1}{\sigma_{thr}(1-\mu_1)}.$$

In some implementations, descriptions will be made by taking that the target component is the valve cage as an example. An average temperature difference in volume $\Delta t_{mv}$ of the valve cage is obtained according to the metal temperature $t_{50v}$ at the measuring point within the second predetermined depth range of the wall thickness of the valve cage and the metal temperature $t_{95v}$ at the measuring point within the third predetermined depth range of the wall thickness of the valve cage, which is $\Delta t_{mv}=|t_{50v}-t_{95v}|$. For example, the second predetermined depth range may be a depth range of 45%-50% of the wall thickness of the valve cage, and the third predetermined depth range may be a depth range of 85%-95% of the wall thickness of the valve cage. The temperature difference ratio $R_{\Delta tv}$ of the valve cage may be obtained according to the average temperature difference in volume $\Delta t_{mv}$ of the valve cage and the thermal stress monitoring parameter $\sigma_{thv}$ of the valve cage, and an elastic modulus $E_2$, a coefficient of linear expansion $\beta_2$ and a Poisson's ratio $\mu_2$ of a material corresponding to the valve cage at the operating temperature, by using the following formula:

$$R_{\Delta tv} = \frac{\Delta t_{mv} E_2 \beta_2}{\sigma_{thv}(1-\mu_2)}.$$

In some implementations, descriptions will be made by taking that the target component is the cylinder as an example. An average temperature difference in volume $\Delta t_{mc}$ of the cylinder is obtained according to a metal temperature $t_{50c}$ at a measuring point within a fourth predetermined depth range of the wall thickness of the cylinder and a metal temperature $t_{95c}$ at a measuring point within a fifth predetermined depth range of the wall thickness of the cylinder, which is $\Delta t_{mc}=|t_{50c}-t_{95c}|$. For example, the fourth predetermined depth range may be a depth range of 45%-50% of the wall thickness of the cylinder, and the fifth predetermined depth range may be a depth range of 85%-95% of the wall thickness of the cylinder. The temperature difference ratio $R_{\Delta tc}$ of the cylinder may be obtained according to the average temperature difference in volume $\Delta t_{mc}$ of the cylinder and the thermal stress monitoring parameter $\sigma_{thc}$ of the cylinder, and an elastic modulus $E_3$, a coefficient of linear expansion $\beta_3$ and a Poisson's ratio $\mu_3$ of a material corresponding to the cylinder at the operating temperature, by using the following formula:

$$R_{\Delta tc} = \frac{\Delta t_{mc} E_3 \beta_3}{\sigma_{thc}(1 - \mu_3)}.$$

At block S403, a temperature difference ratio of the nuclear turbine is determined according to the temperature difference ratio of the rotor, the temperature difference ratio of the valve cage and the temperature difference ratio of the cylinder.

The temperature difference ratio of the nuclear turbine is the first temperature monitoring data obtained by performing online thermal monitoring on the rotor, the valve cage and the cylinder.

In order to realize accurate monitoring of the nuclear turbine, it is required to consider a component with the maximum temperature difference ratio in rotor, valve cage and cylinder, and regulate the nuclear turbine according to the component with the maximum temperature difference ratio, so as to meet optimization requirements of the nuclear turbine. That is, the maximum temperature difference ratio is selected from the temperature difference ratio $R_{\Delta tr}$ of the rotor, the temperature difference ratio $R_{\Delta tv}$ of the valve cage and the temperature difference ratio $R_{\Delta tc}$ of the cylinder, and the maximum temperature difference ratio is determined as the temperature difference ratio of the nuclear turbine, which is the first temperature monitoring data.

Alternatively, the maximum temperature difference ratio $R_{\Delta tmax}$ may be obtained through the following formula:

$$R_{\Delta tmax} = \text{MAX}\{R_{\Delta tr}, R_{\Delta tv}, R_{\Delta tc}\}$$

where MAX{ . . . } is an operation for taking a maximum value.

At block S404, operation and maintenance control of the nuclear turbine is optimized according to the temperature difference ratio of the nuclear turbine.

In embodiments of the present disclosure, a life monitoring situation of the nuclear turbine is determined according to the temperature difference ratio of the nuclear turbine, namely, the first temperature monitoring data, and a corresponding optimization and improvement strategy is generated. The operation and maintenance control of the nuclear turbine is optimized based on the optimization and improvement strategy.

The smaller the temperature difference ratio of the nuclear turbine, while more safety of the life monitoring. Therefore, the life monitoring situation of the nuclear turbine may be obtained by comparing the temperature difference ratio of the nuclear turbine with a first threshold value predetermined based on prior knowledge, so as to optimize the operation and maintenance control of the nuclear turbine. Thus, the temperature difference ratio of the nuclear turbine may be further reduced, and service life and safety of the nuclear turbine may be improved.

At block S405, in response to the temperature difference ratio of the nuclear turbine being less than the predetermined first threshold value, it is determined that the life monitoring of the rotor, the valve cage and the cylinder under the thermal stress caused by the quick starting-up is qualified.

Alternatively, in embodiments of the present disclosure, the first threshold value predetermined based on the prior knowledge may be taken as 1, that is, in response to $R_{\Delta tmax} < 1$, it is determined that the life monitoring of the nuclear turbine under the thermal stress caused by the quick starting-up is qualified. Since the temperature difference ratio of the nuclear turbine is determined by the maximum temperature difference ratio in the temperature difference ratio $R_{\Delta tr}$ of the rotor, the temperature difference ratio $R_{\Delta tv}$ of the valve cage and the temperature difference ratio $R_{\Delta tc}$ of the cylinder, the life monitoring of the rotor, the valve cage and the cylinder under the thermal stress caused by the quick starting-up is qualified, indicating that the life of the rotor, the valve cage and the cylinder under the thermal stress caused by the quick starting-up is under control.

S406, in response to the temperature difference ratio of the nuclear turbine being greater than or equal to the predetermined first threshold value, it is determined that the life monitoring of the rotor, the valve cage and the cylinder under the thermal stress caused by the quick starting-up is unqualified, and the optimization and improvement strategy is generated.

S407, the operation and maintenance control of the nuclear turbine is optimized based on the optimization and improvement strategy, until the temperature difference ratio of the nuclear turbine is less than the predetermined first threshold value.

Alternatively, the optimization and improvement strategy may include reducing a change rate of inlet steam temperature of the nuclear turbine. The change rate of the inlet steam temperature of the nuclear turbine is optimized or adjusted based on the optimization and improvement strategy, and monitoring is performed again until the temperature difference ratio of the nuclear turbine is less than the predetermined first threshold value, and the optimization is ended.

In a case of $R_{\Delta tmax} \geq 1$ it is determined that the life monitoring of the nuclear turbine under the thermal stress caused by the quick starting-up is unqualified, that is, the life monitoring of the rotor, the valve cage and the cylinder under the thermal stress caused by the quick starting-up is unqualified, indicating that the starting-up process of the nuclear turbine is required to be optimized and improved during an operation stage. Alternatively, in embodiments of the present disclosure, the change rate of the inlet steam temperature of the nuclear turbine may be reduced to 0.5-0.8 times of a current change rate of the inlet steam temperature of the nuclear turbine, and monitoring the nuclear turbine may be performed again until the temperature difference ratio of the nuclear turbine is less than the predetermined first threshold value, and the optimization is ended.

In embodiments of the present disclosure, the thermal stress monitoring parameters of the rotor, the valve cage and the cylinder of the nuclear turbine under quick starting-up may be obtained. The temperature difference ratio of the rotor, the temperature difference ratio of the valve cage and the temperature difference ratio of the cylinder may be obtained according to the thermal stress monitoring parameters, and then the temperature difference ratio of the nuclear turbine may be determined. The temperature difference ratio of the nuclear turbine may be compared with the predetermined first threshold value to determine whether the life monitoring of the rotor, the valve cage and the cylinder subjected to the thermal stress caused by the quick starting-up is qualified, so as to realize optimizing operation control of the nuclear turbine. The embodiment of the present disclosure may accurately monitor the service life of the nuclear turbine and the safety during operation, so as to improve the service life of the nuclear turbine and ensure the long-term safe operation of the nuclear turbine.

In the embodiment of the present disclosure, the service life of the nuclear turbine and the safety during operation may be accurately monitored, so as to improve the service life of the nuclear turbine and ensure the long-term safe operation of the nuclear turbine.

Figure 5:
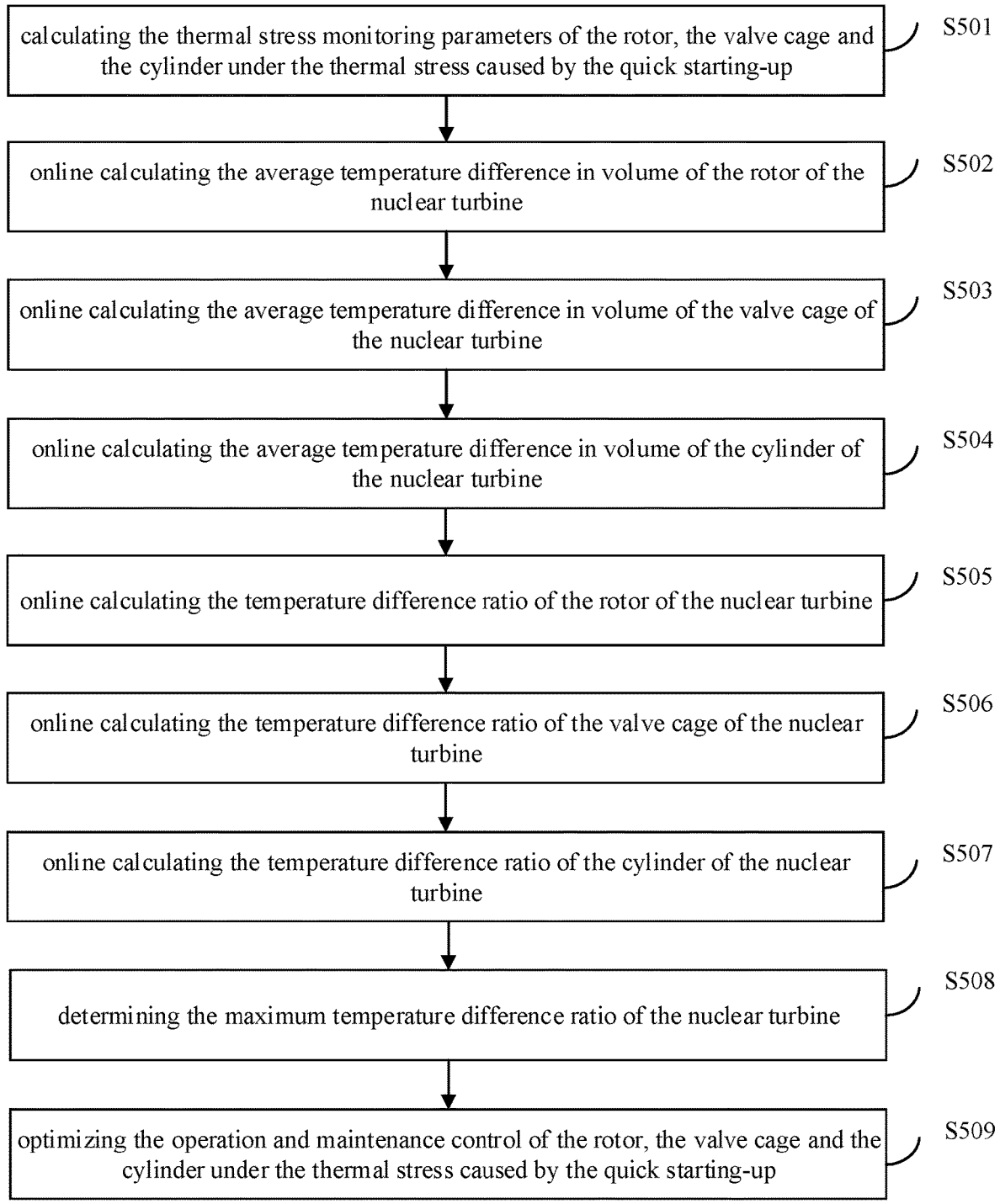
FIG. 5 is a flow chart illustrating a method of online monitoring on a rotor, a valve cage and a cylinder applicable for a specific type of nuclear turbine under quick starting-up according to an embodiment of the present disclosure.

FIG. 5 is a flow chart illustrating a method of online monitoring on a rotor, a valve cage and a cylinder applicable for a specific type of nuclear turbine under quick starting-up according to an embodiment of the present disclosure. As illustrated in FIG. 5, the method includes the following blocks.

At block S501, the thermal stress monitoring parameters of the rotor, the valve cage and the cylinder under the thermal stress caused by the quick starting-up is calculated.

For example, a thermal stress $\sigma_{thr}$ corresponding to 60 years life for the rotor of the nuclear turbine with a model of 1200 MW, a thermal stress $\sigma_{thv}$ corresponding to the 60 years life for the valve cage of the nuclear turbine, a thermal stress $\sigma_{thc}$ corresponding to the 60 years life for the cylinder of the nuclear turbine, a simulation value $t_{mi}$ of a volume average temperature of the rotor during a process of starting-up, shutting down or operating of the nuclear turbine may be calculated based on the component model database 1, the load database 2 and the material database 3 of the nuclear turbine, with inputting the metal temperature of the measuring point at depth of 85%-95% of the wall thickness of the inner cylinder, the a metal temperature of the measuring point at depth of 85%-95% of the wall thickness of the valve cage and the cylinder, the metal temperature of the measuring point at depth of 45%-50% of the wall thickness of the valve cage and the cylinder, and data of design parameters, three-dimensional mechanical models and material mechanical properties of the rotor, the valve cage and the cylinder of the nuclear turbine, through a method for monitoring of the rotor, the valve cage and the cylinder under excessive thermal stress during quick starting-up, where $\sigma_{thr}$=692 MPa, $\sigma_{thv}$=458 MPa, $\sigma_{thc}$=463 MPa, $t_{mi}$=100° C.

At block S502, the average temperature difference in volume of the rotor of the nuclear turbine is calculated online.

For example, an online monitoring value of the metal temperature of the inner cylinder of the nuclear turbine with the model of 1200 MW is $t_{95v}$=270° C., and the average temperature difference in volume $\Delta t_{mr}$ of the rotor of the nuclear turbine with the model of 1200 MW is calculated online according to the following formula:

$$\Delta_{mr}=|t_{mi}-t_{95r}|=|100-270|=170° C.$$

In the above formula, $t_{mi}$ is a simulation value of the average temperature in volume of the rotor during the starting-up process, which is 100° C., and $t_{95r}$ is the metal temperature of the measuring point at the depth of 85%-95% of the wall thickness of the inner cylinder of the nuclear turbine. For example, the metal temperature of the measuring point at the depth of 95% of the wall thickness of the inner cylinder is 270° C.

At block S503, the average temperature difference in volume of the valve cage of the nuclear turbine is calculated online.

For example, online monitoring values of the metal temperatures of the inlet valve cage of the nuclear turbine with the model of 1200 MW are $t_{95v}$=271° C. and $t_{50v}$=138° C., and the average temperature difference in volume $\Delta t_{mv}$ of the valve cage of the nuclear turbine with the model of 1200 MW is calculated online according to the following formula:

$$\Delta t_{mv}=|t_{50v}-t_{95v}|=|138-271|=133° C.$$

In the above formula, $t_{50v}$ is the metal temperature of the measuring point at the depth of 45%-50% of the wall thickness of the valve cage, and in this embodiment, the metal temperature of the measuring point at the depth of 50% of the wall thickness of the valve cage is 138° C.; $t_{95v}$ is the metal temperature of the measuring point at the depth of 85%-95% of the wall thickness of the valve cage. For example, the metal temperature of the measuring point at the depth of 95% of the wall thickness of the valve cage is 271° C.

At block S504, the average temperature difference in volume of the cylinder of the nuclear turbine is calculated online.

For example, online monitoring values of the metal temperatures of the cylinder of the nuclear turbine with the model of 1200 MW are $t_{95c}$=240° C. and $t_{50c}$=130° C., and the average temperature difference in volume $\Delta t_{mc}$ of the cylinder of the nuclear turbine with the model of 1200 MW is calculated online according to the following formula:

$$\Delta t_{mc}=|t_{50c}-t_{95c}|=|130-240|=110° C.$$

In the above formula, $t_{50c}$ is the metal temperature of the measuring point at the depth of 45%-50% of the wall thickness of the cylinder, for example, the metal temperature of the measuring point at the depth of 50% of the wall thickness of the cylinder is 130° C.; $t_{95c}$ is the metal temperature of the measuring point at the depth of 85%-95% of the wall thickness of the cylinder, for example, the metal temperature of the measuring point at the depth of 95% of the wall thickness of the cylinder is 240° C.

At block S505, the temperature difference ratio of the rotor of the nuclear turbine is calculated online.

For example, the temperature difference ratio $R_{\Delta tr}$ of the rotor of the nuclear turbine with the model of 1200 MW is calculated according to the following formula:

$$R_{\Delta tr} = \frac{\Delta t_{mr} E_1 \beta_1}{\sigma_{thr}(1-\mu_1)} = \frac{170 \times 1.9.12 \times 10^5 \times 12.62 \times 10^{-6}}{692 \times (1-0.303)} = 0.885$$

In the above formula, $\Delta t_{mr}$ is the average temperature difference in volume of the rotor, which is 170° C., Et is an elastic modulus of a material corresponding to the rotor at the operating temperature, which is 1.912×10⁵ MPa, $\beta_1$ is a coefficient of linear expansion of the material corresponding to the rotor at the operating temperature, which is 12.62× 10⁻⁶ (1/K), $\mu_1$ is a Poisson's ratio of the material corresponding to the rotor at the operating temperature, which is 0.303, $\sigma_{thr}$ is a thermal stress corresponding to the 60 year service life for the rotor of the nuclear turbine, which is 692 MPa.

At block S506, the temperature difference ratio of the valve cage of the nuclear turbine is calculated online.

For example, the temperature difference ratio $R_{\Delta tv}$ of the valve cage of the nuclear turbine with the model of 1200 MW is calculated according to the following formula:

$$R_{\Delta tv} = \frac{\Delta t_{mv} E_2 \beta_2}{\sigma_{thv}(1-\mu_2)} = \frac{133 \times 1.994 \times 10^5 \times 12.71 \times 10^{-6}}{458 \times (1-0.28)} = 1.022$$

In the above formula, $\Delta t_{mv}$ is the average temperature difference in volume of the valve cage, which is 133° C., $E_2$ is an elastic modulus of a material corresponding to the valve cage at the operating temperature, which is 1.994×10⁵ MPa, $\beta_2$ is a coefficient of linear expansion of the material corresponding to the valve cage at the operating temperature, which is 12.71×10⁻⁶ (1/K), $\mu_2$ is a Poisson's ratio of the material corresponding to the valve cage at the operating temperature, which is 0.28, $\sigma_{thv}$ is a thermal stress corresponding to the 60 year service life for the valve cage of the nuclear turbine, which is 458 MPa.

At block S507, the temperature difference ratio of the cylinder of the nuclear turbine is calculated online.

For example, the temperature difference ratio $R_{\Delta tc}$ of the cylinder of the nuclear turbine with the model of 1200 MW is calculated according to the following formula:

$$R_{\Delta tc} = \frac{\Delta t_{mc} E_3 \beta_3}{\sigma_{thc}(1-\mu_3)} = \frac{110 \times 1.974 \times 10^5 \times 13.00 \times 10^{-6}}{463 \times (1-0.28)} = 0.847$$

In the above formula, $\Delta t_{mc}$ is the average temperature difference in volume of the cylinder, which is 110° C., $E_3$ is an elastic modulus of a material corresponding to the cylinder at the operating temperature, which is $1.974 \times 10^5$ MPa, $\beta_3$ is a coefficient of linear expansion of the material corresponding to the cylinder at the operating temperature, which is $13.00 \times 10^{-6}$ (1/K), $\mu 3$ is a Poisson's ratio of the material corresponding to the cylinder at the operating temperature, which is 0.28, $\sigma_{thc}$ is a thermal stress corresponding to the 60 year service life for the cylinder of the nuclear turbine, which is 463 MPa.

At block S508, the maximum temperature difference ratio of the nuclear turbine is determined.

For example, the maximum temperature difference ratio $R_{\Delta tmax}$ of the nuclear turbine with the model of 1200 MW is calculated according to the following formula:

$$R_{\Delta tmax} = \text{MAX}\{R_{\Delta tr}, R_{\Delta tv}, R_{\Delta tc}\} = \text{MAX}\{0.855, 1.022, 0.847\} = 1.022$$

At block S509, the operation and maintenance control of the rotor, the valve cage and the cylinder under the thermal stress caused by the quick starting-up is optimized.

The life of the rotor, the valve cage and the cylinder under the thermal stress caused by the quick starting-up is determined according to the maximum temperature difference ratio, that is, the first temperature monitoring data, and a corresponding optimization and improvement strategy is generated. The operation and maintenance control of the nuclear turbine is optimized based on the optimization and improvement strategy.

Optimizing the operation and maintenance control may include: monitoring the maximum temperature difference ratio of the nuclear turbine; generating the optimization and improvement strategy of the nuclear turbine in response to the temperature difference ratio not meeting the qualified conditions; optimizing the operation and maintenance control of the starting-up process based on the optimization and improvement strategy; and re-executing the blocks S501 to S508 until the maximum temperature difference ratio is less than 1.

For example, the operation and maintenance control of the rotor, the valve cage and the cylinder of the nuclear turbine with the model of 1200 MW under the action of excessive thermal stress during quick starting-up according to the first temperature monitoring data of the nuclear turbine, that is, the maximum temperature difference ratio.

Due to $R_{\Delta tmax} \geq 1$, the life monitoring of the rotor, the valve cage and the cylinder of the nuclear turbine with the model of 1200 MW under the thermal stress caused by the quick starting-up is unqualified, indicating that the starting-up process of the nuclear turbine with the model of 1200 MW is required to be optimized and improved during an operation stage, for example, the change rate of the inlet steam temperature of the nuclear turbine with the model of 1200 MW may be reduced to 0.6 times of a current change rate, and the blocks S501 to S508 are re-executed, the monitoring results are listed in Table 1. Then when $R_{\Delta tmax} < 1$, the life monitoring of the rotor, the valve cage and the cylinder of the nuclear turbine with the model of 1200 MW under the thermal stress caused by the quick starting-up is qualified, indicating that the life of the rotor, the valve cage and the cylinder under the thermal stress caused by the quick starting-up is under control and the subsequent monitoring process enters.

Table 1 operation monitoring of nuclear turbine under thermal stress of quick starting-up

| step | item | i-th operation monitoring | (i + 1)-th operation monitoring |
| --- | --- | --- | --- |
| S501 | a simulation value of volume average temperature of a rotor | $t_{mi}$ = 100° C. | $t_{mi}$ = 103° C. |
| S502 | a volume average temperature difference of the rotor | $\Delta t_{mr}$ = 170° C. | $\Delta t_{mr}$ = 159° C. |
| S503 | a volume average temperature difference of a valve cage | $\Delta t_{mv}$ = 133° C. | $\Delta t_{mv}$ = 117° C. |
| S504 | a volume average temperature difference of a cylinder | $\Delta t_{mc}$ = 110° C. | $\Delta t_{mc}$ = 102° C. |
| S505 | a temperature difference ratio of the rotor | $R_{\Delta tr}$ = 0.885 | $R_{\Delta tr}$ = 0.796 |
| S506 | a temperature difference ratio of the valve cage | $R_{\Delta tv}$ = 1.022 | $R_{\Delta tv}$ = 0.877 |
| S507 | a temperature difference ratio of the cylinder | $R_{\Delta tc}$ = 0.847 | $R_{\Delta tc}$ = 0.785 |
| S508 | a maximum temperature difference ratio of the nuclear turbine | $R_{\Delta tmax}$ = 1.022 | $R_{\Delta tmax}$ = 0.877 |
| S509 | life optimization control | unqualified service life operation monitoring | qualified service life operation monitoring |

In the embodiment of the present disclosure, the service life of the nuclear turbine and the safety during operation may be accurately monitored, so as to improve the service life of the nuclear turbine and ensure the long-term safe operation of the nuclear turbine.

Figure 6:
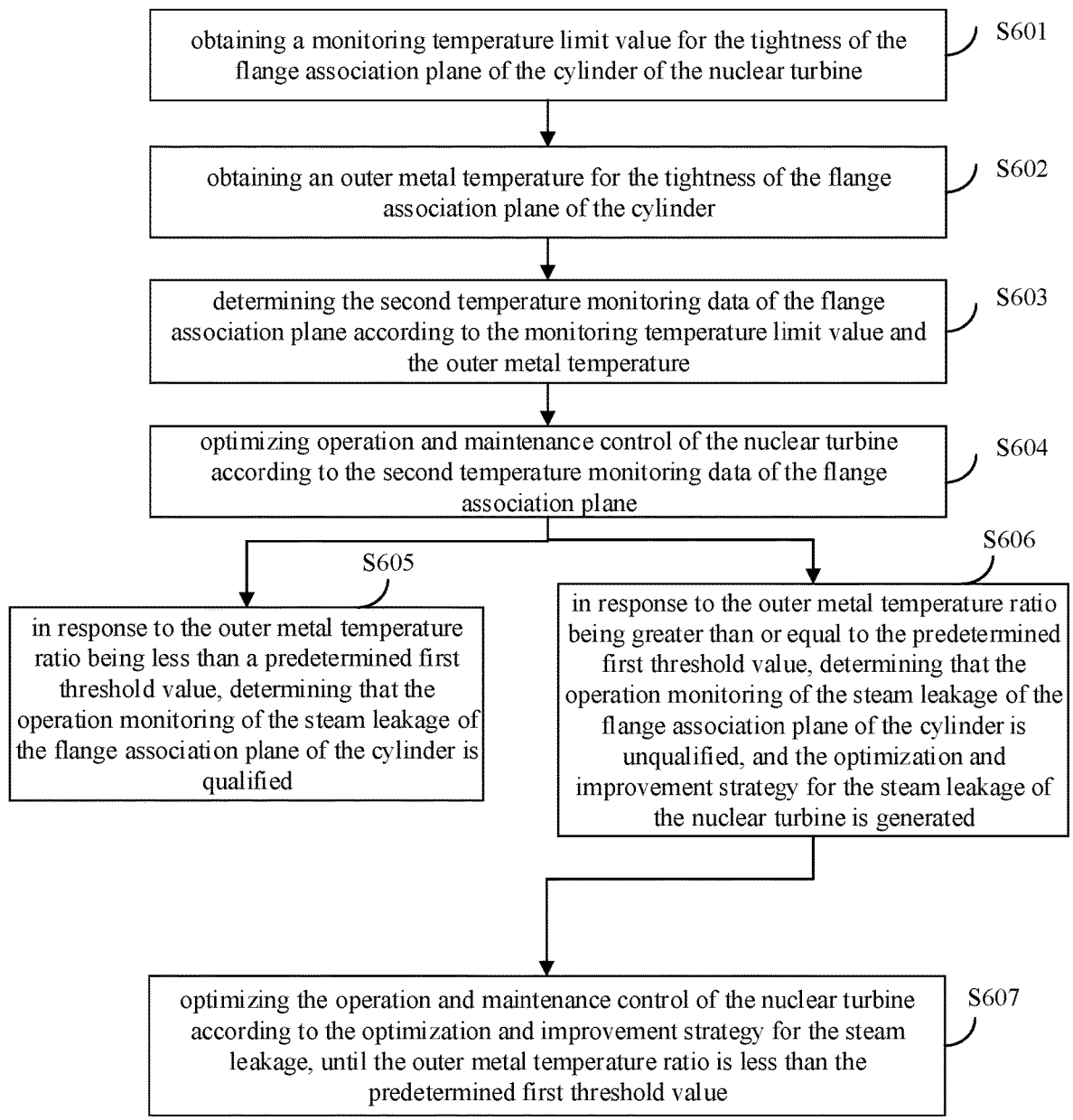
FIG. 6 is a flow chart illustrating a method of online thermal monitoring on tightness of a flange association plane of a cylinder of a nuclear turbine according to another embodiment of the present disclosure.

FIG. 6 is a flow chart illustrating a method of online thermal monitoring on tightness of a flange association plane of a cylinder of a nuclear turbine according to another embodiment of the present disclosure. As illustrated in FIG. 6, the method includes the following blocks.

At block S601, a monitoring temperature limit value for the tightness of the flange association plane of the cylinder of the nuclear turbine is obtained.

A limit value [$t_c$] for the outer metal temperature of the flange association plane under a case that steam leakage occurs at a position with the weakest tightness on the flange association plane of the cylinder of the nuclear cylinder may be calculated, based on the component model database 1, the load database 2 and the material database 3 of the nuclear turbine, with inputting the design parameters and three-dimensional mechanical models of the cylinder of the nuclear turbine, the pressure and thermal load of the cylinder, the pretension load in bolt and material property data, through a method and a subprogram of monitoring the tightness of the flange association plane of the cylinder.

At block S602, an outer metal temperature for the tightness of the flange association plane of the cylinder is obtained.

A temperature at a position with the weakest tightness on the flange association plane of the cylinder is monitored based on the load database of the nuclear turbine, and the online monitoring temperature at the position with the weakest tightness is determined as the outer metal temperature $t_c$.

S603, the second temperature monitoring data of the flange association plane is determined according to the monitoring temperature limit value and the outer metal temperature.

It is noted that an outer metal temperature ratio of the flange association plane is determined, as the second temperature monitoring data of the flange association plane, according to the outer metal temperature and the monitoring temperature limit value.

An outer metal temperature ratio $R_{tc}$ of the flange association plane of the cylinder of the nuclear turbine is calculated according to the following formula:

$$R_{tc} = \frac{t_c}{[t_c]}$$

In the above formula, $t_c$ is the online monitoring temperature at the position with the weakest tightness on the flange association plane of the cylinder of the nuclear turbine; [$t_c$] is the limit value for the outer metal temperature on the outer side of the flange association plane under the case that the steam leakage occurs at the position with the weakest tightness on the flange association plane of the cylinder of the nuclear turbine.

S604, the operation and maintenance control of the nuclear turbine is optimized according to the second temperature monitoring data of the tightness of the flange association plane.

It is determined whether the operation monitoring of the steam leakage of the flange association plane of the cylinder is qualified, and whether the steam leakage occurs at the flange association plane of the cylinder of the nuclear turbine according to the second temperature monitoring data of the tightness of the flange association plane, that is, the outer metal temperature ratio of the flange association plane. In a case that the operation monitoring of the steam leakage of the flange association plane of the cylinder is unqualified, the steam leakage occurs at the flange association plane of the cylinder of the nuclear turbine, the operation and maintenance control of the nuclear turbine is optimized.

S605, in response to the outer metal temperature ratio being less than a predetermined first threshold value, it is determined that the operation monitoring of the steam leakage of the flange association plane of the cylinder is qualified.

The first threshold value is predetermined. In a case that the outer metal temperature ratio is less than the predetermined first threshold value, it is determined that the operation monitoring of the steam leakage of the flange association plane of the cylinder is qualified. For example, the first threshold value is predetermined to 1. In a case that $R_{tc}<1$, it is determined that the operation monitoring of the steam leakage of the flange association plane of the cylinder of the nuclear turbine is qualified, indicating that there is no steam leakage at the flange association plane of the cylinder of the nuclear turbine.

S606, in response to the outer metal temperature ratio being greater than or equal to the predetermined first threshold value, it is determined that the operation monitoring of the steam leakage of the flange association plane of the cylinder is unqualified, and the optimization and improvement strategy for the steam leakage of the nuclear turbine is generated.

In a case that the outer metal temperature ratio is greater than or equal to the predetermined first threshold value, it is determined that the operation monitoring of the steam leakage of the flange association plane of the cylinder is unqualified, and the optimization and improvement strategy for the steam leakage of the nuclear turbine is generated. For example, the first threshold value is predetermined to 1. In a case that $R_{tc} \geq 1$, it is determined that the operation monitoring of the steam leakage of the flange association plane of the cylinder of the nuclear turbine is unqualified, indicating that the steam leakage occurs at the flange association plane of the cylinder of the nuclear turbine during the operation stage, and it is required to generate the optimization and improvement strategy for the steam leakage of the nuclear turbine.

S607, the operation and maintenance control of the nuclear turbine is optimized according to the optimization and improvement strategy for the steam leakage, until the outer metal temperature ratio is less than the predetermined first threshold value, and the optimization is ended.

An adjustment component of the nuclear turbine is obtained according to the optimization and improvement strategy for the steam leakage. The operation and maintenance control of the adjustment component is optimized on the adjustment component according to an adjustment parameter of the adjustment component in the optimization and improvement strategy for steam leakage. Alternatively, the nuclear turbine may be shut down for maintenance and the pretension load in bolt may be increased.

In this disclosure, the monitoring temperature limit value for the tightness of the flange association plane of the cylinder of the nuclear turbine is obtained and the outer metal temperature for the tightness of the flange association plane of the cylinder is obtained. The safe operation monitoring data of the flange association plane according to the monitoring temperature limit value and the outer metal temperature, and the operation and maintenance control of the nuclear turbine is optimized according to the safety operation monitoring data of the tightness of the flange association plane. This disclosure performs the online safety monitoring on the tightness of the flange association plane of the cylinder of the nuclear turbine, optimizes the control of the nuclear turbine in the unqualified case, so as to realize the long life and high reliability of the nuclear turbine.

Figure 7:
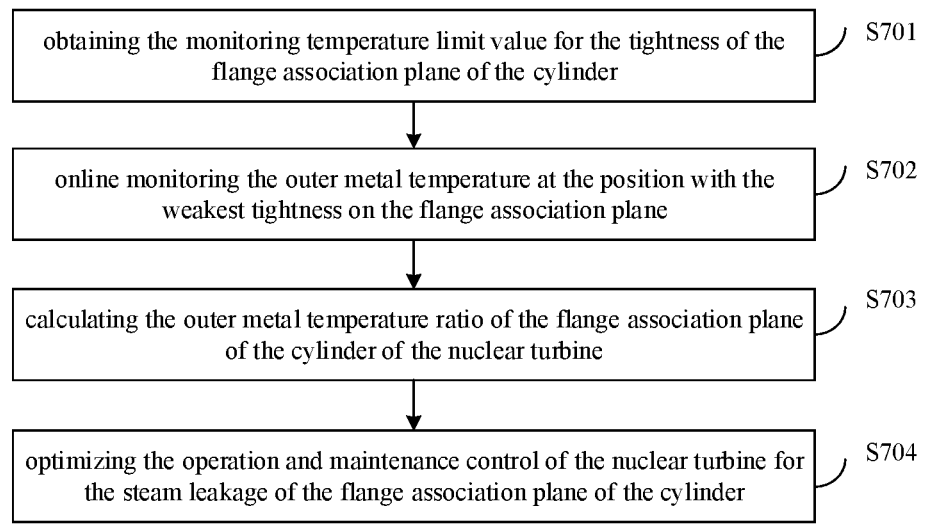
FIG. 7 is a flow chart illustrating a method of online thermal monitoring on tightness of a flange association plane of a cylinder applicable for a nuclear turbine according to another embodiment of the present disclosure.

FIG. 7 is a flow chart illustrating a method of online thermal monitoring on tightness of a flange association plane of a cylinder applicable for a nuclear turbine according to another embodiment of the present disclosure. As illustrated in FIG. 7, the method includes the following blocks.

At block S701, the monitoring temperature limit value for the tightness of the flange association plane of the cylinder is obtained.

For example, the limit value $[t_c]$ for the outer metal temperature on the outer side of the flange association plane under a case that the steam leakage occurs at the position with weakest tightness on the flange association plane of the cylinder of the nuclear cylinder with the model of 1200 MW may be calculated based on the component model database 1, the load database 2 and the material database 3 of the nuclear turbine, with inputting the design parameters and the three-dimensional mechanical models of the cylinder of the nuclear turbine with the model of 1200 MW, the pressure load and thermal load of the cylinder, the pretension load in bolt and material property data, through a method and a subprogram of monitoring on the tightness of the flange association plane of the cylinder, where $[t_c]$=279° C. The position with weakest tightness may be located at an inlet steam part of a double flow high-pressure cylinder.

At block S702, the outer metal temperature at the position with the weakest tightness on the flange association plane is monitored online.

The online monitoring temperature at the position with the weakest tightness on the flange association plane of the cylinder of the nuclear turbine with the model of 1200 MW is monitored online based on the load database of the nuclear turbine, and the online monitoring temperature is determined as the outer metal temperature $t_c$, where $t_c$=264° C.

At block S703, the outer metal temperature ratio of the flange association plane of the cylinder of the nuclear turbine is calculated.

The outer metal temperature ratio $R_{tc}$ of the flange association plane of the cylinder of the nuclear turbine with the model of 1200 MW is calculated according to the following formula:

$$R_{tc} = \frac{t_c}{[t_c]} = \frac{264}{279} = 0.946$$

In the above formula, $t_c$ is an online monitoring value of the outer metal temperature at the position with the weakest tightness on the flange association plane of the cylinder of the nuclear turbine with the model of 1200 MW, which is 264° C.; $[t_c]$ is the limit value for the outer metal temperature of the flange association plane under the case that the steam leakage occurs at the position with the weakest tightness on the flange association plane of the cylinder of the nuclear turbine with the model of 1200 MW, which is 279° C.

It is noted that the outer metal temperature ratio of the flange association plane is determined, as the second temperature monitoring data of the flange association plane, according to the outer metal temperature and the monitoring temperature limit value.

At block S704, the operation and maintenance control of the nuclear turbine is optimized for the steam leakage of the flange association plane of the cylinder.

The optimization control of the steam leakage of the flange association plane is determined based on the second temperature monitoring data of the flange association plane, that is, based on the outer metal temperature ratio of the flange association plane, so as to obtain an optimization and improvement strategy of the steam leakage of the flange association plane, and further optimize the operation and maintenance control of the steam leakage of the flange association plane based on the optimization and improvement strategy.

The steam leakage of the flange association plane of the cylinder of the nuclear turbine with the model of 1200 MW is optimized and controlled.

In a case that $R_{tc}$<1, the operation monitoring of the steam leakage of the flange association plane of the cylinder of the nuclear turbine with the model of 1200 MW is qualified, indicating that there is no steam leakage at the flange association plane of the cylinder of the nuclear turbine with the model of 1200 MW.

In a case that $R_{tc} \geq 1$, the operation monitoring of the steam leakage of the flange association plane of the cylinder of the nuclear turbine with the model of 1200 MW is unqualified, indicating that the steam leakage occurs at the flange association plane of the cylinder of the nuclear turbine with the model of 1200 MW, and it is required to generate the optimization and improvement strategy for the steam leakage of the nuclear turbine. The adjustment component of the nuclear turbine is obtained according to the optimization and improvement strategy for the steam leakage. The operation and maintenance control of the optimization object is optimized according to the optimization information of the optimization object in the optimization and improvement strategy for the steam leakage.

In this disclosure, through the online safety monitoring of the tightness of the flange association plane of the cylinder of the nuclear turbine, the control of the nuclear turbine is optimized in the unqualified case, so as to realize the long life and high reliability of the nuclear turbine.

Figure 8:
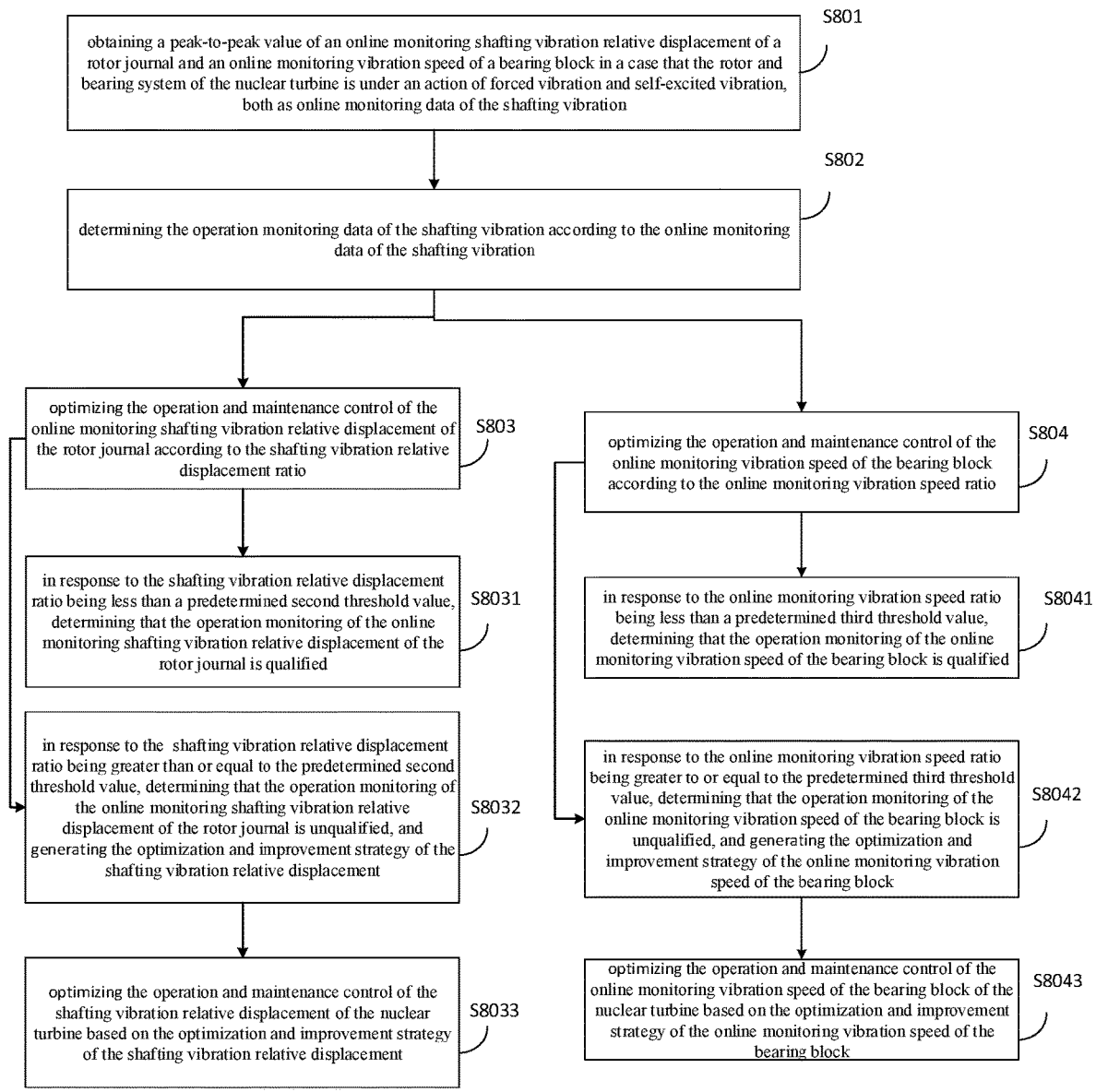
FIG. 8 is a flow chart illustrating a method of online safety monitoring on a shafting vibration of a rotor and bearing system according to another embodiment of the present disclosure.

FIG. 8 is a flow chart illustrating a method of online safety monitoring on a shafting vibration of a rotor and bearing system according to another embodiment of the present disclosure. As illustrated in FIG. 8, the method includes the following blocks.

At block S801, a peak-to-peak value of an online monitoring shafting vibration relative displacement of a rotor journal and an online monitoring vibration speed of a bearing block in a case that the rotor and bearing system of the nuclear turbine is under an action of forced vibration and self-excited vibration are obtained, both as online monitoring data of the shafting vibration.

When the rotor and bearing system are subjected to forced vibration and self-excited vibration, certain damage will be caused on some components of the nuclear turbine, thus affecting safety and service life of the nuclear turbine. In embodiments of the present disclosure, the peak-to-peak value of the online monitoring shafting vibration relative displacement of the rotor journal and the online monitoring vibration speed of the bearing block in the case that the rotor and bearing system of the nuclear turbine is under the action of forced vibration and self-excited vibration are obtained, both as the online monitoring data of the shafting vibration, which is facilitated to the subsequent determination of the operation monitoring data of the shafting vibration.

The online safety monitoring of the shafting vibration is performed on the peak-to-peak value of the online monitoring shafting vibration relative displacement of the rotor journal and the online monitoring vibration speed of the bearing block of the nuclear turbine, based on the component model database 1, the load database 2 and the material database 3 of the nuclear turbine, through a method and a subprogram of monitoring the shafting vibration of the rotor and bearing system under the forced vibration and self-excited vibration, with inputting the design parameters and the three-dimensional mechanical models of the rotor and bearing system of the nuclear turbine, the stiffness coefficient and the damping coefficient of the bearing oil film and the material mechanical property data.

At block S802, the operation monitoring data of the shafting vibration is determined according to the online monitoring data of the shafting vibration.

In embodiments of the present disclosure, the operation monitoring data of the shafting vibration may include a shafting vibration relative displacement ratio and an online monitoring vibration speed ratio.

In some implementations, the shafting vibration relative displacement ratio are determined according to the peak-to-peak value of the online monitoring shafting vibration relative displacement of the rotor journal by the following formula:

$$R_{p-pr} = \frac{D_{p-pr}}{N_{p-pr}}$$

where $R_{p-pr}$ is the shafting vibration relative displacement ratio of the nuclear turbine, $D_{p-pr}$ is the peak-to-peak value (μm) of the online monitoring shafting vibration relative displacement of the rotor journal of the nuclear turbine, and $N_{p-pr}$ is a predetermined value. Alternatively, $N_{p-pr}$ may be taken as 120.

In some implementations, an alarm value of the online monitoring vibration speed of the bearing block is obtained. The online monitoring vibration speed ratio is determined according to the alarm value and the online monitoring vibration speed of the bearing block by the following formula:

$$R_b = \frac{V_b}{[V_b]}$$

where $R_b$ is the online monitoring vibration speed ratio of the nuclear turbine, $V_b$ is the online monitoring vibration speed (mm/s) of the bearing block, $[V_b]$ is the alarm value (mm/s) of the online monitoring vibration speed of the bearing block.

After obtaining the operation monitoring data of the shafting vibration, the operation and maintenance control of the nuclear turbine may be optimized according to the operation monitoring data of the shafting vibration. In some implementations, the online monitoring shafting vibration relative displacement of the rotor journal may be optimized and controlled according to the shafting vibration relative displacement ratio. In some implementations, the online monitoring vibration speed of the bearing block may be optimized and controlled according to the online monitoring vibration speed ratio.

Alternatively, the safety of the rotor and bearing system of the nuclear turbine may be determined according to the shafting vibration relative displacement ratio and the online monitoring vibration speed ratio. In a case that the safety of the rotor and bearing system does not meet a predetermined condition, the operation and maintenance control of the nuclear turbine may be optimized to improve the service life and safety of the nuclear turbine.

At block S803, the operation and maintenance control of the online monitoring shafting vibration relative displacement of the rotor journal is optimized according to the shafting vibration relative displacement ratio.

The optimization control of the online monitoring shafting vibration relative displacement of the rotor journal is determined based on the shafting vibration relative displacement ratio, so as to obtain an optimization and improvement strategy of the shafting vibration relative displacement, and further optimize the operation and maintenance control of the online monitoring shafting vibration relative displacement of the rotor journal based on the optimization and improvement strategy.

At block S8031, in response to the shafting vibration relative displacement ratio being less than a predetermined second threshold value, it is determined that the operation monitoring of the online monitoring shafting vibration relative displacement of the rotor journal is qualified.

At block S8032, in response to the shafting vibration relative displacement ratio being greater than or equal to the predetermined second threshold value, it is determined that the operation monitoring of the online monitoring shafting vibration relative displacement of the rotor journal is unqualified, and the optimization and improvement strategy of the shafting vibration relative displacement is generated.

Alternatively, in embodiment of the present disclosure, the predetermined second threshold value may be taken as 1. That is, in a case that $R_{p-pr}<1$, the operation monitoring of the online monitoring shafting vibration relative displacement of the rotor journal is qualified, indicating that the online monitoring shafting vibration relative displacement of the rotor journal of the nuclear turbine is under control. In a case that $R_{p-pr} \geq 1$, the operation monitoring of the online monitoring shafting vibration relative displacement of the rotor journal is unqualified, indicating that the rotor and bearing of the nuclear turbine is required to examine and repair during the operation stage, a cause of excessive vibration of the rotor and bearing is required to find out and make improvements. The operation and maintenance control of the nuclear turbine is optimized, until the shafting vibration relative displacement ratio is less than the predetermined second threshold value, thus ending the optimization.

At block S8033, the operation and maintenance control of the shafting vibration relative displacement of the nuclear turbine is optimized based on the optimization and improvement strategy of the shafting vibration relative displacement.

At block S804, the operation and maintenance control of the online monitoring vibration speed of the bearing block is optimized according to the online monitoring vibration speed ratio.

The optimization control of the online monitoring vibration speed of the bearing block is determined based on the online monitoring vibration speed ratio, so as to obtain an optimization and improvement strategy of the online monitoring vibration speed, and further optimize the operation and maintenance control of the online monitoring vibration speed of the bearing block based on the optimization and improvement strategy.

At block S8041, in response to the online monitoring vibration speed ratio being less than a predetermined third threshold value, it is determined that the operation monitoring of the online monitoring vibration speed of the bearing block is qualified.

At block S8042, in response to the online monitoring vibration speed ratio being greater to or equal to the predetermined third threshold value, it is determined that the operation monitoring of the online monitoring vibration speed of the bearing block is unqualified, and the optimization and improvement strategy of the online monitoring vibration speed of the bearing block is generated.

Alternatively, in embodiment of the present disclosure, the predetermined third threshold value may be taken as 1. That is, in a case that $R_b$<1, the operation monitoring of the online monitoring vibration speed of the bearing block of the nuclear turbine is qualified, indicating that the online monitoring vibration speed of the bearing block of the nuclear turbine is under control. In a case that $R_b \geq 1$, the operation monitoring of the online monitoring vibration speed of the bearing block of the nuclear turbine is unqualified, indicating that the rotor and bearing of the nuclear turbine is required to examine and repair during the operation stage, a cause of excessive vibration of the rotor and bearing is required to find out and make improvements. The operation and maintenance control of the nuclear turbine is optimized, until the online monitoring vibration speed ratio is less than the predetermined third threshold value, thus ending the optimization.

At block S8043, the operation and maintenance control of the online monitoring vibration speed of the bearing block of the nuclear turbine is optimized based on the optimization and improvement strategy of the online monitoring vibration speed of the bearing block.

In embodiment of the present disclosure, the peak-to-peak value of the online monitoring shafting vibration relative displacement of the rotor journal and the online monitoring vibration speed of the bearing block in the case that the rotor and bearing system of the nuclear turbine is under the action of forced vibration and self-excited vibration are obtained, both as the online monitoring data of the shafting vibration. Then the online safety monitoring data of the shafting vibration is determined, and the operation and maintenance control of the nuclear turbine is optimized. The embodiments of the present disclosure may accurately monitor the safety of the shafting vibration of the rotor and bearing system of the nuclear turbine, and optimize the operation and maintenance control of the nuclear power steam turbine, so as to improve the service life, safety and reliability of the nuclear turbine and ensure the long-term safe operation of the nuclear turbine.

Figure 9:
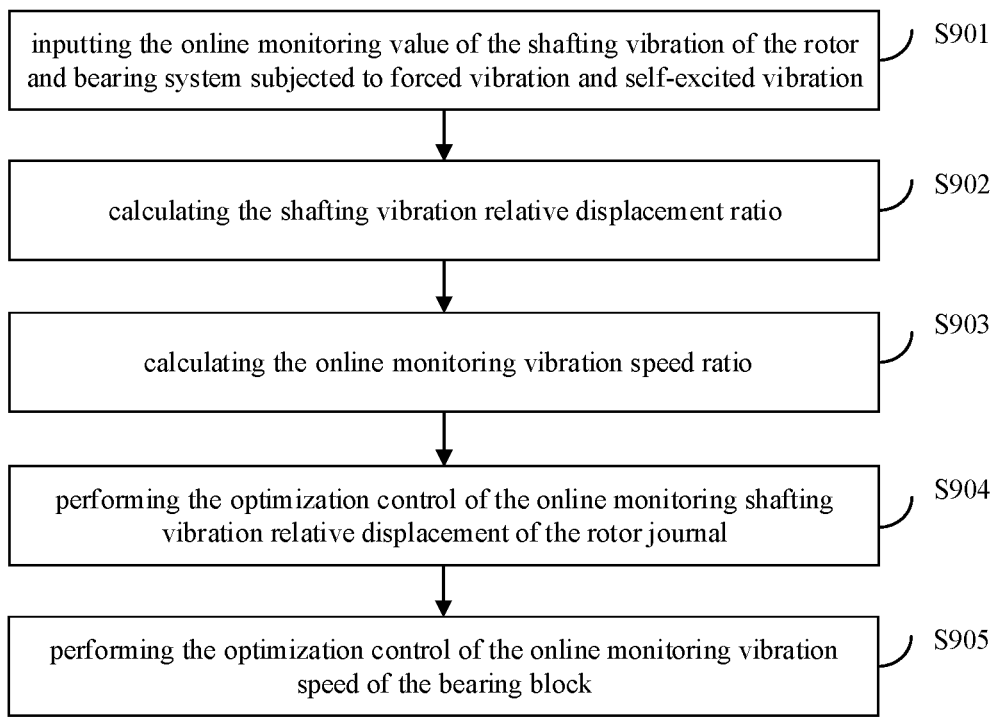
FIG. 9 is a flow chart illustrating a method of online safety monitoring on a shafting vibration applicable for a rotor and bearing system according to another embodiment of the present disclosure.

FIG. 9 is a flow chart illustrating a method of online safety monitoring on a shafting vibration applicable for a rotor and bearing system according to another embodiment of the present disclosure. As illustrated in FIG. 9, the method includes the following blocks.

At block S901, the online monitoring value of the shafting vibration of the rotor and bearing system subjected to forced vibration and self-excited vibration is input.

The online safety monitoring of the shafting vibration is performed based on the component model database 1, load database 2 and material database 3 of the nuclear turbine, with inputting the peak-to-peak value $D_{p-pr}$=100 µm of the online monitoring shafting vibration relative displacement of the rotor journal and the online monitoring vibration speed $V_b$=4 mm/s of the bearing block of the nuclear turbine with the model of 1200 MW, and through a method and a subprogram of online safety monitoring of the shafting vibration of the rotor and bearing system.

At block S902, the shafting vibration relative displacement ratio is calculated.

The shafting vibration relative displacement ratio $R_{p-pr}$ for the rotor journal of the nuclear turbine with the model of 1200 MW is calculated according to the following formula:

$$R_{p-pr} = \frac{D_{p-pr}}{N_{p-pr}} = \frac{100}{120} = 0.883$$

In the above formula, $D_{p-pr}$ is the peak-to-peak value of the online monitoring shafting vibration relative displacement of the rotor journal of the nuclear turbine with the model of 1200 MW, as 100 µm.

At block S903, the online monitoring vibration speed ratio is calculated.

The online monitoring vibration speed ratio $R_b$ for the bearing block of the nuclear turbine with the model of 1200 MW is calculated according to the following formula:

$$R_b = \frac{V_b}{[V_b]} = \frac{4}{5.3} = 0.755$$

In the above formula, $V_b$ is the online monitoring vibration speed of the bearing block, $V_b$=4 mm/s, $[V_b]$ is an alarm value of the online monitoring vibration speed of the bearing block (mm/s), for a half speed nuclear turbine with $n_0$=1500 r/min and 1800 r/min, $[V_b]$=5.3 mm/s, and for a full speed nuclear turbine with $n_0$=3000 r/min and 3600 r/min, $[V_b]$=7.5 mm/s.

It is noted that the operation monitoring data of the online monitoring shafting vibration includes the shafting vibration relative displacement ratio and the online monitoring vibration speed ratio.

At block S904, the optimization control of the online monitoring shafting vibration relative displacement of the rotor journal is performed.

The optimization control of the online monitoring shafting vibration relative displacement of the rotor journal is determined based on the shafting vibration relative displacement ratio, so as to obtain an optimization and improvement strategy of the shafting vibration relative displacement.

The online monitoring shafting vibration relative displacement of the rotor journal of the nuclear turbine with the model of 1200 MW is optimized and controlled through the optimization and improvement strategy of the shafting vibration relative displacement.

Since $R_{p-pr}$=0.833<1, the operation monitoring of the online monitoring shafting vibration relative displacement of the rotor journal of the nuclear turbine with the model of 1200 MW is qualified, indicating that the online monitoring shafting vibration relative displacement of the rotor journal of the nuclear turbine is under control, entering the block S905.

At block S905, the optimization control of the online monitoring vibration speed of the bearing block is performed.

The optimization control of the online monitoring vibration speed of the bearing block is determined based on the online monitoring vibration speed ratio, so as to obtain an optimization and improvement strategy of the online monitoring vibration speed.

The online monitoring vibration speed of the bearing block of the nuclear turbine with the model of 1200 MW is optimized and controlled through the optimization and improvement strategy of the online monitoring vibration speed of the bearing block.

Since $R_b$=0.755<1, the operation monitoring of the online monitoring vibration speed of the bearing block of the nuclear turbine with the model of 1200 MW is qualified, indicating that the online monitoring vibration speed of the bearing block of the nuclear turbine is under control. Then the online safety monitoring of the shafting vibration is ended.

In other cases, in a case that $R_b \geq 1$, the operation monitoring of the online monitoring vibration speed of the bearing block of the nuclear turbine is unqualified, indicating that the rotor and bearing of the nuclear turbine is required to examine and repair during the operation stage, a cause of excessive vibration of the rotor and bearing is required to find out and make improvements. The blocks S901 to S905 are re-executed until $R_b < 1$.

The embodiments of the present disclosure may accurately monitor the safety of the shafting vibration of the rotor and bearing system of the nuclear turbine, and optimize the operation and maintenance control of the nuclear turbine, so as to improve the service life and operation reliability of the nuclear turbine and ensure the long-term safe operation of the nuclear turbine.

On the basis of the above embodiments, a monitoring report of the nuclear turbine may also be printed or output. The monitoring report may include monitoring data of multiple dimensions under each objective of the nuclear turbine and the corresponding optimization and improvement strategies. Alternatively, the monitoring report may further include information such as optimization results of the nuclear turbine.

Figure 10:
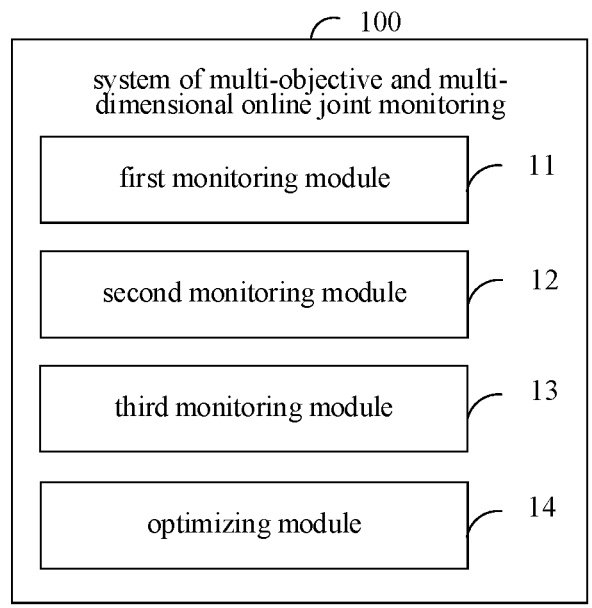
FIG. 10 is a block diagram illustrating a system of multi-objective and multi-dimensional online joint monitoring for a nuclear turbine according to an embodiment of the present disclosure.

Based on the same concept, embodiments of the present disclosure also provide a system of multi-objective and multi-dimensional online joint monitoring for a nuclear turbine. FIG. 10 is a block diagram illustrating a system of multi-objective and multi-dimensional online joint monitoring for a nuclear turbine according to an embodiment of the present disclosure. As illustrated in FIG. 10, the system 100 may include a first monitoring module 11, a second monitoring module 12, a third monitoring module 13 and an optimizing module 14.

The first monitoring module 11 is configured to obtain first temperature monitoring data of the nuclear turbine by performing online thermal monitoring on a rotor, a valve cage and a cylinder of the nuclear turbine under quick starting-up.

The second monitoring module 12 is configured to obtain second temperature monitoring data of tightness of a flange association plane of the cylinder of the nuclear turbine by performing online thermal monitoring on the tightness of the flange association plane.

The third monitoring module 13 is configured to obtain operation monitoring data of a shafting vibration of a rotor and bearing system of the nuclear turbine by performing online safety monitoring on the shafting vibration of the rotor and bearing system.

The optimizing module 14 is configured to optimize operation and maintenance control of the nuclear turbine according to at least one type of monitoring data among the first temperature monitoring data, the second temperature monitoring data and the operation monitoring data.

In some embodiments, the first monitoring module 11 is configured to:

obtain thermal stress monitoring parameters of the rotor, the valve cage and the cylinder of the nuclear turbine under quick starting-up for multiple operating conditions;

obtain a temperature difference ratio of the rotor, a temperature difference ratio of the valve cage and a temperature difference ratio of the cylinder according to the thermal stress monitoring parameters; and determine a temperature difference ratio of the nuclear turbine as the first temperature monitoring data according to the temperature difference ratio of the rotor, the temperature difference ratio of the valve cage and the temperature difference ratio of the cylinder.

In some embodiments, the first monitoring module 11 is configured to:

obtain an average temperature difference in volume and a thermal stress monitoring parameter of the target component, wherein the target component is one of the rotor, the valve cage and the cylinder;

obtain material attribute data of a material corresponding to the target component at an operating temperature; and determine the temperature difference ratio of the target component according to the average temperature difference in volume, the material attribute data and the thermal stress monitoring parameter of the target component.

In some embodiments, the first monitoring module 11 is configured to:

select a maximum temperature difference ratio from the temperature difference ratio of the rotor, the temperature difference ratio of the valve cage and the temperature difference ratio of the cylinder, and determine the maximum temperature difference ratio as the temperature difference ratio of the nuclear turbine.

In some embodiments, the second monitoring module 12 is configured to:

obtain a monitoring temperature limit value for the tightness of the flange association plane of the cylinder of the nuclear turbine;

obtain an outer metal temperature for the tightness of the flange association plane of the cylinder; and determine the second temperature monitoring data of the flange association plane according to the monitoring temperature limit value and the outer metal temperature.

In some embodiments, the second monitoring module 12 is configured to:

determine an outer metal temperature ratio of the flange association plane as the second temperature monitoring data according to the outer metal temperature and the monitoring temperature limit value.

In some embodiments, the third monitoring module 13 is configured to:

obtain a peak-to-peak value of an online monitoring shafting vibration relative displacement of a rotor journal and an online monitoring vibration speed of a bearing block in a case that the rotor and bearing system of the nuclear turbine is under an action of forced vibration and self-excited vibration, both as online monitoring data of the shafting vibration; and determine the operation monitoring data of the shafting vibration according to the online monitoring data of the shafting vibration.

In some embodiments, the third monitoring module 13 is configured to:

determine a shafting vibration relative displacement ratio according to the peak-to-peak value of the online monitoring shafting vibration relative displacement of the rotor journal;

determine an online monitoring vibration speed ratio according to the online monitoring vibration speed of the bearing block;

determine the shafting vibration relative displacement ratio and the online monitoring vibration speed ratio as the operation monitoring data of the shafting vibration.

In some embodiments, the optimizing module 14 is configured to:

obtain respective monitoring qualification conditions for the first temperature monitoring data, the second temperature monitoring data and the operation monitoring data;

perform abnormal determination on each of the first temperature monitoring data, the second temperature monitoring data and the operation monitoring data based on the corresponding monitoring qualification conditions, to determine abnormal monitoring data that does not meet the monitoring qualification condition;

generate an optimization strategy set of the nuclear turbine based on the abnormal monitoring data that does not meet the monitoring qualification condition, wherein the optimization strategy set comprises at least one optimization and improvement strategy;

optimize the operation and maintenance control of the nuclear turbine according to the optimization strategy set.

In some embodiments, the optimizing module 14 is configured to:

obtain an optimization object of the nuclear turbine according to the optimization strategy set;

optimize the optimization object according to optimization information of the optimization object in the optimization strategy set.

In some embodiments, the optimizing module 14 is configured to:

continue supervising the abnormal monitoring data that does not meet the respective monitoring qualification conditions;

in response to monitoring data obtained again still not meeting the monitoring qualification condition, update the optimization and improvement strategy, and continue optimizing the optimization object based on the updated optimization and improvement strategy.

In embodiments of the present disclosure, multi-objective and multi-dimensional online monitoring is performed for the nuclear turbine, so as to optimize the service life, safety and reliability of the nuclear turbine and ensure the long-life, high safety and high reliability operation of the nuclear turbine.

Based on the same concept, embodiments of the present disclosure also provide an electronic device.

Figure 11:
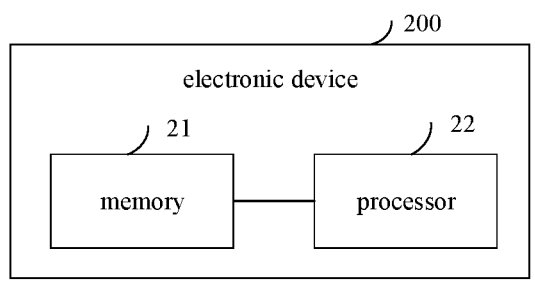
FIG. 11 is a block diagram illustrating an electronic device according to an embodiment of the present disclosure.

FIG. 11 is a block diagram illustrating an electronic device according to an embodiment of the present disclosure. As illustrated in FIG. 11, the electronic device 200 includes a memory 21, a processor 22 and a computer program product stored on the memory 23 and executable on the processor 22. When the computer program is executed by the processor, the method of multi-objective and multi-dimensional online joint monitoring of the nuclear turbine provided by the above embodiments is implemented.

Based on the same concept, embodiments of the present disclosure also provide a non-transiency computer-readable storage medium having computer instructions stored thereon. The computer instructions are configured to cause a computer to execute the method of multi-objective and multi-dimensional online joint monitoring of the nuclear turbine according to any one of the above embodiments.

Based on the same concept, embodiments of the present disclosure also provide a computer program product having a computer program. The method of multi-objective and multi-dimensional online joint monitoring of the nuclear turbine according to any one of the above embodiments is implemented when the computer program is executed by a processor.

Those skilled in the art should understand that embodiments of the present disclosure may be provided as methods, systems, or computer program products. Therefore, the present disclosure may take the form of a complete hardware embodiment, a complete software embodiment, or an embodiment combining software and hardware. Furthermore, the present disclosure may take the form of a computer program product implemented on one or more computer usable storage media (including but not limited to disk memory, CD-ROM, optical memory, etc.) containing computer usable program codes.

The present disclosure is described with reference to the flow chart and/or block diagram of the methods, devices (systems), and computer program products according to embodiments of the present disclosure. It should be understood that each process and/or block in the flowchart and/or block diagram and the combination of processes and/or blocks in the flowchart and/or block diagram may be realized by computer program instructions. These computer program instructions may be provided to a processor of a general-purpose computer, a special-purpose computer, an embedded processor or other programmable data processing equipment to generate a machine, causing instructions executed by the processor of the computer or other programmable data processing devices to generate a device for realizing functions specified in one or more processes of the flowchart and/or one or more blocks of the block diagram.

These computer program instructions may also be stored in a computer-readable memory that may guide the computer or other programmable data processing devices to operate in a specific manner, causing the instructions stored in the computer-readable memory to generate a manufactured product including an instruction device. The instruction device realizes the functions specified in one or more processes of the flowchart and/or one or more blocks of the block diagram.

These computer program instructions may also be loaded on a computer or other programmable data processing devices so that a series of operation steps are performed on the computer or other programmable device to generate computer implemented processing. Thus, instructions executed on the computer or other programmable device provide steps for implementing the functions specified in one or more processes of the flowchart and/or one or more blocks of the block diagram.

Based on the same concept, embodiments of the present disclosure also provide a computer-readable storage medium having computer instructions stored thereon. The computer instructions are configured to cause a computer to execute a method of online safety monitoring for shafting vibration of the rotor and bearing system according to any one of the above embodiments.

Based on the same concept, embodiments of the present disclosure also provide a computer program product having a computer program. A method of online safety monitoring for shafting vibration of the rotor and bearing system according to any one of the above embodiments is implemented when the computer program is executed by a processor.

It should be noted that in the claims, any reference symbol between parentheses should not be constructed as a limitation of the claims. The word "include" does not exclude existence of components or steps not listed in the claims. The word "a" or "the" before a component does not exclude existence of multiple such components. The present disclosure may be realized by means of hardware including several different components and by means of a properly programmed computer. In the unit claims listing several devices, several of these devices may be embodied by the same hardware item. The usage of words "first", "second", and "third" does not indicate any order. These words may be interpreted as names.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Although preferred embodiments of the present disclosure have been described, those skilled in the art may make additional changes and modifications to these embodiments once they know basic inventive concept. Therefore, the appended claims are intended to be interpreted as including the preferred embodiments and all changes and modifications falling within the scope of the present disclosure.

Obviously, those skilled in the art may make various changes and modifications to the present disclosure without departing from the spirit and scope of the present disclosure. Thus, if these modifications and variants of the present disclosure fall within the scope of the claims of the present disclosure and its equivalent technology, the present disclosure is also intended to include these modifications and variants.

What is claimed:

1. A method of multi-objective and multi-dimensional online joint monitoring for a nuclear turbine, comprising:
    obtaining first temperature monitoring data of the nuclear turbine by performing online thermal monitoring on a rotor, a valve cage and a cylinder of the nuclear turbine under quick starting-up;
    obtaining second temperature monitoring data of tightness of a flange association plane of the cylinder of the nuclear turbine by performing online thermal monitoring on the tightness of the flange association plane;
    obtaining operation monitoring data of a shafting vibration of a rotor and bearing system of the nuclear turbine by performing online safety monitoring on the shafting vibration of the rotor and bearing system; and
    optimizing operation and maintenance control of the nuclear turbine according to at least one type of monitoring data among the first temperature monitoring data, the second temperature monitoring data and the operation monitoring data.

2. The method according to claim 1, wherein obtaining the first temperature monitoring data of the nuclear turbine by performing the online thermal monitoring on the rotor, the valve cage and the cylinder of the nuclear turbine under quick starting-up comprises:
    obtaining thermal stress monitoring parameters of the rotor, the valve cage and the cylinder of the nuclear turbine under quick starting-up for multiple operating conditions;
    obtaining a temperature difference ratio of the rotor, a temperature difference ratio of the valve cage and a temperature difference ratio of the cylinder according to the thermal stress monitoring parameters; and
    determining a temperature difference ratio of the nuclear turbine, as the first temperature monitoring data, according to the temperature difference ratio of the rotor, the temperature difference ratio of the valve cage and the temperature difference ratio of the cylinder.

3. The method according to claim 2, wherein a process for obtaining a temperature difference ratio of a target component of the nuclear turbine comprises:
    obtaining an average temperature difference in volume and a thermal stress monitoring parameter of the target component, wherein the target component is one of the rotor, the valve cage and the cylinder;
    obtaining material attribute data of a material corresponding to the target component at an operating temperature; and
    determining the temperature difference ratio of the target component according to the average temperature difference in volume, the material attribute data and the thermal stress monitoring parameter of the target component.

4. The method according to claim 3, wherein determining the temperature difference ratio of the nuclear turbine according to the temperature difference ratio of the rotor, the temperature difference ratio of the valve cage and the temperature difference ratio of the cylinder comprises:
    selecting a maximum temperature difference ratio from the temperature difference ratio of the rotor, the temperature difference ratio of the valve cage and the temperature difference ratio of the cylinder; and
    determining the maximum temperature difference ratio as the temperature difference ratio of the nuclear turbine.

5. The method according to claim 1, wherein obtaining the second temperature monitoring data of the tightness of the flange association plane of the cylinder of the nuclear turbine by performing the online thermal monitoring on the tightness of the flange association plane comprises:
    obtaining a monitoring temperature limit value for the tightness of the flange association plane of the cylinder of the nuclear turbine;
    obtaining an outer metal temperature for the tightness of the flange association plane of the cylinder; and
    determining the second temperature monitoring data of the flange association plane according to the monitoring temperature limit value and the outer metal temperature.

6. The method according to claim 5, wherein determining the second temperature monitoring data of the flange association plane according to the monitoring temperature limit value and the outer metal temperature comprises:
    determining an outer metal temperature ratio of the flange association plane as the second temperature monitoring data according to the outer metal temperature and the monitoring temperature limit value.

7. The method according to claim 1, wherein obtaining operation monitoring data of a shafting vibration of a rotor and bearing system of the nuclear turbine by performing online safety monitoring on the shafting vibration of the rotor and bearing system comprises:
    obtaining a peak-to-peak value of an online monitoring shafting vibration relative displacement of a rotor journal and an online monitoring vibration speed of a bearing block in a case that the rotor and bearing system of the nuclear turbine is under an action of forced vibration and self-excited vibration, both as online monitoring data of the shafting vibration; and
    determining the operation monitoring data of the shafting vibration according to the online monitoring data of the shafting vibration.

8. The method according to claim 7, wherein determining the operation monitoring data of the shafting vibration according to the online monitoring data of the shafting vibration comprises:
    determining a shafting vibration relative displacement ratio according to the peak-to-peak value of the online monitoring shafting vibration relative displacement of the rotor journal;

determining an online monitoring vibration speed ratio according to the online monitoring vibration speed of the bearing block;

determining the shafting vibration relative displacement ratio and the online monitoring vibration speed ratio as the operation monitoring data of the shafting vibration.

9. The method according to claim 1, wherein optimizing the operation and maintenance control of the nuclear turbine according to the at least one type of monitoring data among the first temperature monitoring data, the second temperature monitoring data and the operation monitoring data comprises:

obtaining respective monitoring qualification conditions for the first temperature monitoring data, the second temperature monitoring data and the operation monitoring data;

performing abnormal determination on each of the first temperature monitoring data, the second temperature monitoring data and the operation monitoring data based on the corresponding monitoring qualification condition, to determine abnormal monitoring data that does not meet the monitoring qualification condition;

generating an optimization strategy set of the nuclear turbine based on the abnormal monitoring data that does not meet the monitoring qualification condition, wherein the optimization strategy set comprises at least one optimization and improvement strategy;

optimizing the operation and maintenance control of the nuclear turbine according to the optimization strategy set.

10. The method according to claim 9, wherein optimizing the operation and maintenance control of the nuclear turbine according to the optimization strategy set comprises:

obtaining an optimization object of the nuclear turbine according to the optimization strategy set;

optimizing the optimization object according to optimization information of the optimization object in the optimization strategy set.

11. The method according to claim 10, after optimizing the optimization object according to the optimization information of the optimization object in the optimization strategy set, further comprising:

continuing supervising the abnormal monitoring data that does not meet the monitoring qualification condition;

in response to monitoring data obtained again still not meeting the monitoring qualification condition, updating the optimization and improvement strategy, and continuing optimizing the optimization object based on the updated optimization and improvement strategy.

12. An electronic device, comprising:

at least one processor; and a memory communicatively connected to the at least one processor; wherein, the memory stores instructions executable by the at least one processor, and when the instructions are executed by the at least one processor, the at least one processor is configured to:

obtain first temperature monitoring data of the nuclear turbine by performing online thermal monitoring on a rotor, a valve cage and a cylinder of the nuclear turbine under quick starting-up;

obtain second temperature monitoring data of tightness of a flange association plane of the cylinder of the nuclear turbine by performing online thermal monitoring on the tightness of the flange association plane;

obtain operation monitoring data of a shafting vibration of a rotor and bearing system of the nuclear turbine by performing online safety monitoring on the shafting vibration of the rotor and bearing system; and optimize operation and maintenance control of the nuclear turbine according to at least one type of monitoring data among the first temperature monitoring data, the second temperature monitoring data and the operation monitoring data.

13. The electronic device according to claim 12, wherein the at least one processor is configured to:

obtain thermal stress monitoring parameters of the rotor, the valve cage and the cylinder of the nuclear turbine under quick starting-up for multiple operating conditions;

obtain a temperature difference ratio of the rotor, a temperature difference ratio of the valve cage and a temperature difference ratio of the cylinder according to the thermal stress monitoring parameters; and determine a temperature difference ratio of the nuclear turbine, as the first temperature monitoring data, according to the temperature difference ratio of the rotor, the temperature difference ratio of the valve cage and the temperature difference ratio of the cylinder.

14. The electronic device according to claim 13, wherein the at least one processor is configured to:

obtain an average temperature difference in volume and a thermal stress monitoring parameter of the target component, wherein the target component is one of the rotor, the valve cage and the cylinder;

obtain material attribute data of a material corresponding to the target component at an operating temperature; and determine the temperature difference ratio of the target component according to the average temperature difference in volume, the material attribute data and the thermal stress monitoring parameter of the target component.

15. The electronic device according to claim 12, wherein the at least one processor is configured to:

obtain a monitoring temperature limit value for the tightness of the flange association plane of the cylinder of the nuclear turbine;

obtain an outer metal temperature for the tightness of the flange association plane of the cylinder; and determine the second temperature monitoring data of the flange association plane according to the monitoring temperature limit value and the outer metal temperature.

16. The electronic device according to claim 15, wherein the at least one processor is configured to:

determine an outer metal temperature ratio of the flange association plane as the second temperature monitoring data according to the outer metal temperature and the monitoring temperature limit value.

17. The electronic device according to claim 12, wherein the at least one processor is configured to:

obtain a peak-to-peak value of an online monitoring shafting vibration relative displacement of a rotor journal and an online monitoring vibration speed of a bearing block in a case that the rotor and bearing system of the nuclear turbine is under an action of forced vibration and self-excited vibration, both as online monitoring data of the shafting vibration; and determine the operation monitoring data of the shafting vibration according to the online monitoring data of the shafting vibration.

18. The electronic device according to claim 17, wherein the at least one processor is configured to:

determine a shafting vibration relative displacement ratio according to the peak-to-peak value of the online monitoring shafting vibration relative displacement of the rotor journal;

determine an online monitoring vibration speed ratio according to the online monitoring vibration speed of the bearing block;

determine the shafting vibration relative displacement ratio and the online monitoring vibration speed ratio as the operation monitoring data of the shafting vibration.

19. The electronic device according to claim 12, wherein the at least one processor is configured to:

obtain respective monitoring qualification conditions for the first temperature monitoring data, the second temperature monitoring data and the operation monitoring data;

perform abnormal determination on each of the first temperature monitoring data, the second temperature monitoring data and the operation monitoring data based on the corresponding monitoring qualification condition, to determine abnormal monitoring data that does not meet the monitoring qualification condition;

generate an optimization strategy set of the nuclear turbine based on the abnormal monitoring data that does not meet the monitoring qualification condition, wherein the optimization strategy set comprises at least one optimization and improvement strategy;

optimize the operation and maintenance control of the nuclear turbine according to the optimization strategy set.

20. A non-transiency computer-readable storage medium having computer instructions stored thereon, wherein the computer instructions are configured to cause a computer to execute a method of multi-objective and multi-dimensional online joint monitoring for a nuclear turbine, and the method comprises:

obtaining first temperature monitoring data of the nuclear turbine by performing online thermal monitoring on a rotor, a valve cage and a cylinder of the nuclear turbine under quick starting-up;

obtaining second temperature monitoring data of tightness of a flange association plane of the cylinder of the nuclear turbine by performing online thermal monitoring on the tightness of the flange association plane;

obtaining operation monitoring data of a shafting vibration of a rotor and bearing system of the nuclear turbine by performing online safety monitoring on the shafting vibration of the rotor and bearing system; and optimizing operation and maintenance control of the nuclear turbine according to at least one type of monitoring data among the first temperature monitoring data, the second temperature monitoring data and the operation monitoring data.

\* \* \* \* \*